US010019338B1

(12) United States Patent
Goradia et al.

(10) Patent No.: US 10,019,338 B1
(45) Date of Patent: *Jul. 10, 2018

(54) USER INTERFACE WITH REAL-TIME VISUAL PLAYBACK ALONG WITH SYNCHRONOUS TEXTUAL ANALYSIS LOG DISPLAY AND EVENT/TIME INDEX FOR ANOMALOUS BEHAVIOR DETECTION IN APPLICATIONS

(71) Applicant: FireEye, Inc., Milpitas, CA (US)

(72) Inventors: Harnish Goradia, Milpitas, CA (US); Osman Abdoul Ismael, Palo Alto, CA (US); Noah M. Johnson, Oakland, CA (US); Adrian Mettler, Milpitas, CA (US); Ashar Aziz, Coral Gables, FL (US)

(73) Assignee: FireEye, Inc., Milpitas, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/949,770

(22) Filed: Nov. 23, 2015

Related U.S. Application Data

(63) Continuation of application No. 13/775,174, filed on Feb. 23, 2013, now Pat. No. 9,195,829.

(51) Int. Cl.
| | |
|---|---|
| *G06F 21/00* | (2013.01) |
| *G06F 11/36* | (2006.01) |

(Continued)

(52) U.S. Cl.
CPC ...... *G06F 11/3608* (2013.01); *G06F 11/3612* (2013.01); *G06F 11/3664* (2013.01);

(Continued)

(58) Field of Classification Search
CPC .................. H04L 63/12; H04L 63/14
See application file for complete search history.

(56) References Cited

U.S. PATENT DOCUMENTS

| | | |
|---|---|---|
| 4,292,580 A | 9/1981 | Ott et al. |
| 5,175,732 A | 12/1992 | Hendel et al. |

(Continued)

FOREIGN PATENT DOCUMENTS

| | | |
|---|---|---|
| GB | 2439806 A | 1/2008 |
| WO | 02/006928 A2 | 1/2002 |

(Continued)

OTHER PUBLICATIONS

"Network Security: NetDetector—Network Intrusion Forensic System (NIFS) Whitepaper", ("NetDetector Whitepaper"), (2003).

(Continued)

*Primary Examiner* — Madhuri R Herzog
(74) *Attorney, Agent, or Firm* — Rutan & Tucker, LLP

(57) ABSTRACT

An apparatus is described for detecting anomalous behavior by an application software under test that suggests a presence of malware. The apparatus features a hardware processor and a storage device. The storage device stores logic that, when executed by the hardware processor, conducts an analysis of operations of the software for an occurrence of one or more events, generates a video of a display output produced by the operations of the software, and generates, for display contemporaneously with the video, a textual log including information associated with the one or more events, the textual log provides information as to when each event of the one or more events occurs within an execution flow of the operations of the software.

25 Claims, 16 Drawing Sheets

(51) Int. Cl.
*H04L 29/06* (2006.01)
*G06F 21/55* (2013.01)
*G06F 21/56* (2013.01)
*G06F 21/53* (2013.01)

(52) U.S. Cl.
CPC .............. *G06F 21/53* (2013.01); *G06F 21/55* (2013.01); *G06F 21/554* (2013.01); *G06F 21/566* (2013.01); *H04L 63/14* (2013.01); *H04L 63/1416* (2013.01)

(56) References Cited

U.S. PATENT DOCUMENTS

| | | | |
|---|---|---|---|
| 5,440,723 A | 8/1995 | Arnold et al. | |
| 5,657,473 A | 8/1997 | Killean et al. | |
| 5,842,002 A | 11/1998 | Schnurer et al. | |
| 5,978,917 A | 11/1999 | Chi | |
| 6,088,803 A | 7/2000 | Tso et al. | |
| 6,094,677 A | 7/2000 | Capek et al. | |
| 6,269,330 B1 | 7/2001 | Cidon et al. | |
| 6,279,113 B1 | 8/2001 | Vaidya | |
| 6,298,445 B1 | 10/2001 | Shostack et al. | |
| 6,357,008 B1 | 3/2002 | Nachenberg | |
| 6,424,627 B1 | 7/2002 | slashed.rhaug et al. | |
| 6,484,315 B1 | 11/2002 | Ziese | |
| 6,487,666 B1 | 11/2002 | Shanklin et al. | |
| 6,493,756 B1 | 12/2002 | O'Brien et al. | |
| 6,550,012 B1 | 4/2003 | Villa et al. | |
| 6,775,657 B1 | 8/2004 | Baker | |
| 6,832,367 B1 | 12/2004 | Choi et al. | |
| 6,895,550 B2 | 5/2005 | Kanchirayappa et al. | |
| 6,898,632 B2 | 5/2005 | Gordy et al. | |
| 6,907,396 B1 | 6/2005 | Muttik et al. | |
| 6,971,097 B1 | 11/2005 | Wallman | |
| 6,981,279 B1 | 12/2005 | Arnold et al. | |
| 7,007,107 B1 | 2/2006 | Ivchenko et al. | |
| 7,028,179 B2 | 4/2006 | Anderson et al. | |
| 7,043,757 B2 | 5/2006 | Hoefelmeyer et al. | |
| 7,069,316 B1 | 6/2006 | Gryaznov | |
| 7,080,408 B1 | 7/2006 | Pak et al. | |
| 7,093,002 B2 | 8/2006 | Wolff et al. | |
| 7,093,239 B1 | 8/2006 | van der Made | |
| 7,100,201 B2 | 8/2006 | Izatt | |
| 7,159,149 B2 | 1/2007 | Spiegel et al. | |
| 7,231,667 B2 | 6/2007 | Jordan | |
| 7,240,364 B1 | 7/2007 | Branscomb et al. | |
| 7,240,368 B1 | 7/2007 | Roesch et al. | |
| 7,287,278 B2 | 10/2007 | Liang | |
| 7,308,716 B2 | 12/2007 | Danford et al. | |
| 7,356,736 B2 | 4/2008 | Natvig | |
| 7,386,888 B2 | 6/2008 | Liang et al. | |
| 7,392,542 B2 | 6/2008 | Bucher | |
| 7,418,729 B2 | 8/2008 | Szor | |
| 7,428,300 B1 | 9/2008 | Drew et al. | |
| 7,441,272 B2 | 10/2008 | Durham et al. | |
| 7,448,084 B1 | 11/2008 | Apap et al. | |
| 7,458,098 B2 | 11/2008 | Judge et al. | |
| 7,464,404 B2 | 12/2008 | Carpenter et al. | |
| 7,464,407 B2 | 12/2008 | Nakae et al. | |
| 7,467,408 B1 | 12/2008 | O'Toole, Jr. | |
| 7,480,773 B1 | 1/2009 | Reed | |
| 7,487,543 B2 | 2/2009 | Arnold et al. | |
| 7,496,960 B1 | 2/2009 | Chen et al. | |
| 7,496,961 B2 | 2/2009 | Zimmer et al. | |
| 7,519,990 B1 | 4/2009 | Xie | |
| 7,523,493 B2 | 4/2009 | Liang et al. | |
| 7,530,104 B1 | 5/2009 | Thrower et al. | |
| 7,540,025 B2 | 5/2009 | Tzadikario | |
| 7,565,550 B2 | 7/2009 | Liang et al. | |
| 7,603,715 B2 | 10/2009 | Costa et al. | |
| 7,607,171 B1 | 10/2009 | Marsden et al. | |
| 7,639,714 B2 | 12/2009 | Stolfo et al. | |
| 7,644,441 B2 | 1/2010 | Schmid et al. | |
| 7,676,841 B2 | 3/2010 | Sobchuk et al. | |
| 7,698,548 B2 | 4/2010 | Shelest et al. | |
| 7,707,633 B2 | 4/2010 | Danford et al. | |
| 7,779,463 B2 | 8/2010 | Stolfo et al. | |
| 7,784,097 B1 | 8/2010 | Stolfo et al. | |
| 7,832,008 B1 | 11/2010 | Kraemer | |
| 7,849,506 B1 | 12/2010 | Dansey et al. | |
| 7,869,073 B2 | 1/2011 | Oshima | |
| 7,877,803 B2 | 1/2011 | Enstone et al. | |
| 7,904,959 B2 | 3/2011 | Sidiroglou et al. | |
| 7,908,660 B2 | 3/2011 | Bahl | |
| 7,930,738 B1 | 4/2011 | Petersen | |
| 7,937,761 B1 | 5/2011 | Bennett | |
| 7,996,556 B2 | 8/2011 | Raghavan et al. | |
| 7,996,836 B1 | 8/2011 | McCorkendale et al. | |
| 7,996,905 B2 | 8/2011 | Arnold et al. | |
| 8,006,305 B2 | 8/2011 | Aziz | |
| 8,010,667 B2 | 8/2011 | Zhang et al. | |
| 8,020,206 B2 | 9/2011 | Hubbard et al. | |
| 8,028,338 B1 | 9/2011 | Schneider et al. | |
| 8,045,094 B2 | 10/2011 | Teragawa | |
| 8,045,458 B2 | 10/2011 | Alperovitch et al. | |
| 8,069,484 B2 | 11/2011 | McMillan et al. | |
| 8,087,086 B1 | 12/2011 | Lai et al. | |
| 8,171,553 B2 | 5/2012 | Aziz et al. | |
| 8,201,246 B1 | 6/2012 | Wu et al. | |
| 8,204,984 B1 | 6/2012 | Aziz et al. | |
| 8,220,055 B1 | 7/2012 | Kennedy | |
| 8,225,288 B2 | 7/2012 | Miller et al. | |
| 8,225,373 B2 | 7/2012 | Kraemer | |
| 8,233,882 B2 | 7/2012 | Rogel | |
| 8,234,709 B2 | 7/2012 | Viljoen et al. | |
| 8,239,944 B1 | 8/2012 | Nachenberg et al. | |
| 8,286,251 B2 | 10/2012 | Eker et al. | |
| 8,291,499 B2 | 10/2012 | Aziz et al. | |
| 8,307,435 B1 | 11/2012 | Mann et al. | |
| 8,307,443 B2 | 11/2012 | Wang et al. | |
| 8,312,545 B2 | 11/2012 | Tuvell et al. | |
| 8,321,936 B1 | 11/2012 | Green et al. | |
| 8,321,941 B2 | 11/2012 | Tuvell et al. | |
| 8,365,286 B2 | 1/2013 | Poston | |
| 8,370,938 B1 | 2/2013 | Daswani et al. | |
| 8,370,939 B2 | 2/2013 | Zaitsev et al. | |
| 8,375,444 B2 | 2/2013 | Aziz et al. | |
| 8,381,299 B2 | 2/2013 | Stolfo et al. | |
| 8,402,529 B1 | 3/2013 | Green et al. | |
| 8,510,827 B1 | 8/2013 | Leake et al. | |
| 8,510,842 B2 | 8/2013 | Amit et al. | |
| 8,516,593 B2 | 8/2013 | Aziz | |
| 8,528,086 B1 | 9/2013 | Aziz | |
| 8,539,582 B1 | 9/2013 | Aziz et al. | |
| 8,549,638 B2 | 10/2013 | Aziz | |
| 8,561,177 B1 | 10/2013 | Aziz et al. | |
| 8,566,946 B1 | 10/2013 | Aziz et al. | |
| 8,584,094 B2 | 11/2013 | Dadhia et al. | |
| 8,584,234 B1 | 11/2013 | Sobel et al. | |
| 8,584,239 B2 | 11/2013 | Aziz et al. | |
| 8,595,834 B2 | 11/2013 | Xie et al. | |
| 8,627,476 B1 | 1/2014 | Satish et al. | |
| 8,635,696 B1 | 1/2014 | Aziz | |
| 8,713,681 B2 | 4/2014 | Silberman et al. | |
| 8,826,240 B1 * | 9/2014 | Lachwani | G06F 8/30 714/38.1 |
| 9,409,090 B1 * | 8/2016 | McKenzie | A63F 13/355 |
| 2001/0005889 A1 | 6/2001 | Albrecht | |
| 2001/0047326 A1 | 11/2001 | Broadbent et al. | |
| 2002/0018903 A1 | 2/2002 | Kokubo et al. | |
| 2002/0038430 A1 | 3/2002 | Edwards et al. | |
| 2002/0091819 A1 | 7/2002 | Melchione et al. | |
| 2002/0144156 A1 | 10/2002 | Copeland | |
| 2002/0162015 A1 | 10/2002 | Tang | |
| 2002/0166063 A1 | 11/2002 | Lachman et al. | |
| 2002/0184528 A1 | 12/2002 | Shevenell et al. | |
| 2002/0188887 A1 | 12/2002 | Largman et al. | |
| 2002/0194490 A1 | 12/2002 | Halperin et al. | |
| 2003/0074578 A1 | 4/2003 | Ford et al. | |
| 2003/0084318 A1 | 5/2003 | Schertz | |
| 2003/0115483 A1 | 6/2003 | Liang | |
| 2003/0188190 A1 | 10/2003 | Aaron et al. | |
| 2003/0200460 A1 | 10/2003 | Morota et al. | |
| 2003/0212902 A1 | 11/2003 | van der Made | |

(56) References Cited

U.S. PATENT DOCUMENTS

| | | |
|---|---|---|
| 2003/0237000 A1 | 12/2003 | Denton et al. |
| 2004/0003323 A1 | 1/2004 | Bennett et al. |
| 2004/0015712 A1 | 1/2004 | Szor |
| 2004/0019832 A1 | 1/2004 | Arnold et al. |
| 2004/0047356 A1 | 3/2004 | Bauer |
| 2004/0083408 A1 | 4/2004 | Spiegel et al. |
| 2004/0093513 A1 | 5/2004 | Cantrell et al. |
| 2004/0111531 A1 | 6/2004 | Staniford et al. |
| 2004/0165588 A1 | 8/2004 | Pandya |
| 2004/0236963 A1 | 11/2004 | Danford et al. |
| 2004/0243349 A1 | 12/2004 | Greifeneder et al. |
| 2004/0249911 A1 | 12/2004 | Alkhatib et al. |
| 2004/0255161 A1 | 12/2004 | Cavanaugh |
| 2004/0268147 A1 | 12/2004 | Wiederin et al. |
| 2005/0021740 A1 | 1/2005 | Bar et al. |
| 2005/0033960 A1 | 2/2005 | Vialen et al. |
| 2005/0033989 A1 | 2/2005 | Poletto et al. |
| 2005/0050148 A1 | 3/2005 | Mohammadioun et al. |
| 2005/0086523 A1 | 4/2005 | Zimmer et al. |
| 2005/0091513 A1 | 4/2005 | Mitomo et al. |
| 2005/0091533 A1 | 4/2005 | Omote et al. |
| 2005/0114663 A1 | 5/2005 | Cornell et al. |
| 2005/0125195 A1 | 6/2005 | Brendel |
| 2005/0157662 A1 | 7/2005 | Bingham et al. |
| 2005/0183143 A1 | 8/2005 | Anderholm et al. |
| 2005/0201297 A1 | 9/2005 | Peikari |
| 2005/0210533 A1 | 9/2005 | Copeland et al. |
| 2005/0238005 A1 | 10/2005 | Chen et al. |
| 2005/0265331 A1 | 12/2005 | Stolfo |
| 2006/0010495 A1 | 1/2006 | Cohen et al. |
| 2006/0015715 A1 | 1/2006 | Anderson |
| 2006/0021054 A1 | 1/2006 | Costa et al. |
| 2006/0031476 A1 | 2/2006 | Mathes et al. |
| 2006/0047665 A1 | 3/2006 | Neil |
| 2006/0070130 A1 | 3/2006 | Costea et al. |
| 2006/0075496 A1 | 4/2006 | Carpenter et al. |
| 2006/0095968 A1 | 5/2006 | Portolani et al. |
| 2006/0101516 A1 | 5/2006 | Sudaharan et al. |
| 2006/0101517 A1 | 5/2006 | Banzhof et al. |
| 2006/0117385 A1 | 6/2006 | Mester et al. |
| 2006/0123477 A1 | 6/2006 | Raghavan et al. |
| 2006/0143709 A1 | 6/2006 | Brooks et al. |
| 2006/0150249 A1 | 7/2006 | Gassen et al. |
| 2006/0161983 A1 | 7/2006 | Cothrell et al. |
| 2006/0161987 A1 | 7/2006 | Levy-Yurista |
| 2006/0161989 A1 | 7/2006 | Reshef et al. |
| 2006/0164199 A1 | 7/2006 | Gilde et al. |
| 2006/0173992 A1 | 8/2006 | Weber et al. |
| 2006/0179147 A1 | 8/2006 | Tran et al. |
| 2006/0184632 A1 | 8/2006 | Marino et al. |
| 2006/0191010 A1 | 8/2006 | Benjamin |
| 2006/0221956 A1 | 10/2006 | Narayan et al. |
| 2006/0236393 A1 | 10/2006 | Kramer et al. |
| 2006/0242709 A1 | 10/2006 | Seinfeld et al. |
| 2006/0251104 A1 | 11/2006 | Koga |
| 2006/0288417 A1 | 12/2006 | Bookbinder et al. |
| 2007/0006288 A1 | 1/2007 | Mayfield et al. |
| 2007/0006313 A1 | 1/2007 | Porras et al. |
| 2007/0011174 A1 | 1/2007 | Takaragi et al. |
| 2007/0016951 A1 | 1/2007 | Piccard et al. |
| 2007/0033645 A1 | 2/2007 | Jones |
| 2007/0038943 A1 | 2/2007 | Fitzgerald et al. |
| 2007/0064689 A1 | 3/2007 | Shin et al. |
| 2007/0094730 A1 | 4/2007 | Bhikkaji et al. |
| 2007/0143827 A1 | 6/2007 | Nicodemus et al. |
| 2007/0156895 A1 | 7/2007 | Vuong |
| 2007/0157180 A1 | 7/2007 | Tillmann et al. |
| 2007/0157306 A1 | 7/2007 | Elrod et al. |
| 2007/0171824 A1 | 7/2007 | Ruello et al. |
| 2007/0174915 A1 | 7/2007 | Gribble et al. |
| 2007/0192500 A1 | 8/2007 | Lum |
| 2007/0192858 A1 | 8/2007 | Lum |
| 2007/0192863 A1 | 8/2007 | Kapoor et al. |
| 2007/0198275 A1 | 8/2007 | Malden et al. |
| 2007/0240218 A1 | 10/2007 | Tuvell et al. |
| 2007/0240219 A1 | 10/2007 | Tuvell et al. |
| 2007/0240220 A1 | 10/2007 | Tuvell et al. |
| 2007/0240222 A1 | 10/2007 | Tuvell et al. |
| 2007/0250930 A1 | 10/2007 | Aziz et al. |
| 2007/0271446 A1 | 11/2007 | Nakamura |
| 2007/0285578 A1 | 12/2007 | Hirayama et al. |
| 2008/0005782 A1 | 1/2008 | Aziz |
| 2008/0072326 A1 | 3/2008 | Danford et al. |
| 2008/0077793 A1 | 3/2008 | Tan et al. |
| 2008/0080518 A1 | 4/2008 | Hoeflin et al. |
| 2008/0098476 A1 | 4/2008 | Syversen |
| 2008/0120722 A1 | 5/2008 | Sima et al. |
| 2008/0134178 A1 | 6/2008 | Fitzgerald et al. |
| 2008/0134334 A1 | 6/2008 | Kim et al. |
| 2008/0141376 A1 | 6/2008 | Clausen et al. |
| 2008/0184373 A1 | 7/2008 | Traut et al. |
| 2008/0189787 A1 | 8/2008 | Arnold et al. |
| 2008/0215742 A1 | 9/2008 | Goldszmidt et al. |
| 2008/0222729 A1 | 9/2008 | Chen et al. |
| 2008/0263665 A1 | 10/2008 | Ma et al. |
| 2008/0295172 A1 | 11/2008 | Bohacek |
| 2008/0301810 A1 | 12/2008 | Lehane et al. |
| 2008/0307524 A1 | 12/2008 | Singh et al. |
| 2008/0320594 A1 | 12/2008 | Jiang |
| 2009/0007100 A1 | 1/2009 | Field et al. |
| 2009/0013408 A1 | 1/2009 | Schipka |
| 2009/0031423 A1 | 1/2009 | Liu et al. |
| 2009/0036111 A1 | 2/2009 | Danford et al. |
| 2009/0044024 A1 | 2/2009 | Oberheide et al. |
| 2009/0044274 A1 | 2/2009 | Budko et al. |
| 2009/0083369 A1 | 3/2009 | Marmor |
| 2009/0083855 A1 | 3/2009 | Apap et al. |
| 2009/0089879 A1 | 4/2009 | Wang et al. |
| 2009/0094697 A1 | 4/2009 | Provos et al. |
| 2009/0125976 A1 | 5/2009 | Wassermann et al. |
| 2009/0126015 A1 | 5/2009 | Monastyrsky et al. |
| 2009/0126016 A1 | 5/2009 | Sobko et al. |
| 2009/0133125 A1 | 5/2009 | Choi et al. |
| 2009/0158430 A1 | 6/2009 | Borders |
| 2009/0187992 A1 | 7/2009 | Poston |
| 2009/0193293 A1 | 7/2009 | Stolfo et al. |
| 2009/0199296 A1 | 8/2009 | Xie et al. |
| 2009/0228233 A1 | 9/2009 | Anderson et al. |
| 2009/0241187 A1 | 9/2009 | Troyansky |
| 2009/0241190 A1 | 9/2009 | Todd et al. |
| 2009/0265692 A1 | 10/2009 | Godefroid et al. |
| 2009/0271867 A1 | 10/2009 | Zhang |
| 2009/0300761 A1 | 12/2009 | Park et al. |
| 2009/0328185 A1 | 12/2009 | Berg et al. |
| 2009/0328221 A1 | 12/2009 | Blumfield et al. |
| 2010/0017546 A1 | 1/2010 | Poo et al. |
| 2010/0043073 A1 | 2/2010 | Kuwamura |
| 2010/0054278 A1 | 3/2010 | Stolfo et al. |
| 2010/0058474 A1 | 3/2010 | Hicks |
| 2010/0064044 A1 | 3/2010 | Nonoyama |
| 2010/0077481 A1 | 3/2010 | Polyakov et al. |
| 2010/0083376 A1 | 4/2010 | Pereira et al. |
| 2010/0115621 A1 | 5/2010 | Staniford et al. |
| 2010/0132038 A1* | 5/2010 | Zaitsev .............. G06F 21/552 726/22 |
| 2010/0154056 A1 | 6/2010 | Smith et al. |
| 2010/0192223 A1 | 7/2010 | Ismael et al. |
| 2010/0251104 A1 | 9/2010 | Massand |
| 2010/0281102 A1 | 11/2010 | Chinta et al. |
| 2010/0281541 A1 | 11/2010 | Stolfo et al. |
| 2010/0281542 A1 | 11/2010 | Stolfo et al. |
| 2010/0287260 A1 | 11/2010 | Peterson et al. |
| 2011/0025504 A1 | 2/2011 | Lyon et al. |
| 2011/0041179 A1 | 2/2011 | Stahlberg |
| 2011/0047594 A1 | 2/2011 | Mahaffey et al. |
| 2011/0047620 A1 | 2/2011 | Mahaffey et al. |
| 2011/0078794 A1 | 3/2011 | Manni et al. |
| 2011/0093951 A1 | 4/2011 | Aziz |
| 2011/0099633 A1 | 4/2011 | Aziz |
| 2011/0113231 A1 | 5/2011 | Kaminsky |
| 2011/0145920 A1 | 6/2011 | Mahaffey et al. |
| 2011/0167494 A1 | 7/2011 | Bowen et al. |
| 2011/0219450 A1 | 9/2011 | McDougal et al. |
| 2011/0247072 A1 | 10/2011 | Staniford et al. |

(56) References Cited

U.S. PATENT DOCUMENTS

| | | |
|---|---|---|
| 2011/0265182 A1 | 10/2011 | Peinado et al. |
| 2011/0307954 A1 | 12/2011 | Melnik et al. |
| 2011/0307955 A1 | 12/2011 | Kaplan et al. |
| 2011/0307956 A1 | 12/2011 | Yermakov et al. |
| 2011/0314546 A1 | 12/2011 | Aziz et al. |
| 2012/0079596 A1 | 3/2012 | Thomas et al. |
| 2012/0084859 A1 | 4/2012 | Radinsky et al. |
| 2012/0117652 A1 | 5/2012 | Manni et al. |
| 2012/0174186 A1 | 7/2012 | Aziz et al. |
| 2012/0174218 A1 | 7/2012 | McCoy et al. |
| 2012/0198279 A1 | 8/2012 | Schroeder |
| 2012/0210423 A1 | 8/2012 | Friedrichs et al. |
| 2012/0222121 A1 | 8/2012 | Staniford et al. |
| 2012/0278886 A1 | 11/2012 | Luna |
| 2012/0297489 A1 | 11/2012 | Dequevy |
| 2012/0330801 A1 | 12/2012 | McDougal et al. |
| 2013/0036472 A1 | 2/2013 | Aziz |
| 2013/0047257 A1 | 2/2013 | Aziz |
| 2013/0080634 A1* | 3/2013 | Grelewicz ............ H04W 24/06 709/224 |
| 2013/0097706 A1 | 4/2013 | Titonis et al. |
| 2013/0111587 A1 | 5/2013 | Goel et al. |
| 2013/0160130 A1 | 6/2013 | Mendelev et al. |
| 2013/0160131 A1 | 6/2013 | Madou et al. |
| 2013/0227691 A1 | 8/2013 | Aziz et al. |
| 2013/0246370 A1 | 9/2013 | Bartram et al. |
| 2013/0263260 A1 | 10/2013 | Mahaffey et al. |
| 2013/0291109 A1 | 10/2013 | Staniford et al. |
| 2013/0298243 A1 | 11/2013 | Kumar et al. |
| 2014/0053260 A1 | 2/2014 | Gupta et al. |
| 2014/0053261 A1 | 2/2014 | Gupta et al. |
| 2015/0012647 A1* | 1/2015 | Grelewicz ............... H04L 67/22 709/224 |
| 2016/0249106 A1* | 8/2016 | Lachwani ............ H04N 21/482 |

FOREIGN PATENT DOCUMENTS

| | | | |
|---|---|---|---|
| WO | 02/23805 | A2 | 3/2002 |
| WO | 2007/117636 | A2 | 10/2007 |
| WO | 2008/041950 | A2 | 4/2008 |
| WO | 2011/084431 | A2 | 7/2011 |
| WO | 2012/145066 | A1 | 10/2012 |

OTHER PUBLICATIONS

"Packet", Microsoft Computer Dictionary, Microsoft Press, (Mar. 2002), 1 page.
"When Virtual is Better Than Real", IEEEXplore Digital Library, available at, http://ieeexplore.ieee.org/xpl/articleDetails.isp?reload=true&arnumbe- r=990073, (Dec. 7, 2013).
Abdullah, et al., Visualizing Network Data for Intrusion Detection, 2005 IEEE Workshop on Information Assurance and Security, pp. 100-108.
Adetoye, Adedayo , et al., "Network Intrusion Detection & Response System", ("Adetoye"), (Sep. 2003).
AltaVista Advanced Search Results. "attack vector identifier". Http://www.altavista.com/web/results?ltag=ody&pg=aq &aqmode=aqa=Event+Orch- estrator . . . , (Accessed on Sep. 15, 2009).
AltaVista Advanced Search Results. "Event Orchestrator". Http://www.altavista.com/web/results?ltag=ody&pg=aq &aqmode=aqa=Event+Orch- esrator . . . , (Accessed on Sep. 3, 2009).
Aura, Tuomas, "Scanning electronic documents for personally identifiable information", Proceedings of the 5th ACM workshop on Privacy in electronic society. ACM, 2006.
Baecher, "The Nepenthes Platform: An Efficient Approach to collect Malware", Springer-verlag Berlin Heidelberg, (2006), pp. 165-184.
Bayer, et al., "Dynamic Analysis of Malicious Code", J Comput Virol, Springer-Verlag, France., (2006), pp. 67-77.
Boubalos, Chris , "extracting syslog data out of raw pcap dumps, seclists.org, Honeypots mailing list archives", available at http://seclists.org/honeypots/2003/q2/319 ("Boubalos"), (Jun. 5, 2003).
Chaudet, C. , et al., "Optimal Positioning of Active and Passive Monitoring Devices", International Conference on Emerging Networking Experiments and Technologies, Proceedings of the 2005 ACM Conference on Emerging Network Experiment and Technology, CoNEXT '05, Toulousse, France, (Oct. 2005), pp. 71-82.
Chen, P. M. and Noble, B. D., "When Virtual is Better Than Real, Department of Electrical Engineering and Computer Science", University of Michigan ("Chen") (2001).
Cisco, Configuring the Catalyst Switched Port Analyzer (SPAN) ("Cisco"), (1992).
Cohen, M.I. , "PyFlag—An advanced network forensic framework", Digital investigation 5, Elsevier, (2008), pp. S112-S120.
Costa, M. , et al., "Vigilante: End-to-End Containment of Internet Worms", SOSP '05, Association for Computing Machinery, Inc., Brighton U.K., (Oct. 23-26, 2005).
Crandall, J.R. , et al., "Minos:Control Data Attack Prevention Orthogonal to Memory Model", 37th International Symposium on Microarchitecture, Portland, Oregon, (Dec. 2004).
Deutsch, P. , "Zlib compressed data format specification version 3.3" RFC 1950, (1996).
Distler, "Malware Analysis: An Introduction", SANS Institute InfoSec Reading Room, SANS Institute, (2007).
Dunlap, George W. , et al., "ReVirt: Enabling Intrusion Analysis through Virtual-Machine Logging and Replay", Proceeding of the 5th Symposium on Operating Systems Design and Implementation, USENIX Association, ("Dunlap"), (Dec. 9, 2002).
Excerpt regarding First Printing Date for Merike Kaeo, Designing Network Security ("Kaeo"), (2005).
Filiol, Eric , et al., "Combinatorial Optimisation of Worm Propagation on an Unknown Network", International Journal of Computer Science 2.2 (2007).
Gibler, Clint, et al. AndroidLeaks: automatically detecting potential privacy leaks in android applications on a large scale. Springer Berlin Heidelberg, 2012.
Goel, et al., Reconstructing System State for Intrusion Analysis, Apr. 2008 SIGOPS Operating Systems Review, vol. 42 Issue 3, pp. 21-28.
IEEE Xplore Digital Library Sear Results for "detection of unknown computer worms". Http//ieeexplore.ieee.org/searchresult.jsp?SortField=Score&SortOrder=desc- &ResultC . . . , (Accessed on Aug. 28, 2009).
Kaeo, Merike , "Designing Network Security", ("Kaeo"), (Nov. 2003).
Kim, H. , et al., "Autograph: Toward Automated, Distributed Worm Signature Detection", Proceedings of the 13th Usenix Security Symposium (Security 2004), San Diego, (Aug. 2004), pp. 271-286.
King, Samuel T., et al., "Operating System Support for Virtual Machines", ("King") (2003).
Krasnyansky, Max , et al., Universal TUN/TAP driver, available at https://www.kernl.org/doc/Documentation/networking/tuntap.txt (2002) ("Krasnyansky").
Kreibich, C. , et al., "Honeycomb-Creating Intrusion Detection Signatures Using Honeypots", 2nd Workshop on Hot Topics in Networks (HotNets-11), Boston, USA, (2003).
Kristoff, J. , "Botnets, Detection and Mitigation: DNS-Based Techniques", NU Security Day, (2005), 23 pages.
Liljenstam, Michael , et al., "Simulating Realistic Network Traffic for Worm Warning System Design and Testing", Institute for Security Technology studies, Dartmouth College ("Liljenstam"), (Oct. 27, 2003).
Marchette, David J., "Computer Intrusion Detection and Network Monitoring: A Statistical Viewpoint", ("Marchette"), (2001).
Margolis, P.E. , "Random House Webster's 'Computer & Internet Dictionary 3rd Edition'", ISBN 0375703519, (Dec. 1998).
Moore, D. , et al., "Internet Quarantine: Requirements for Containing Self-Propagating Code", INFOCOM, vol. 3, (Mar. 30-Apr. 3, 2003), pp. 1901-1910.
Morales, Jose A., et al., ""Analyzing and exploiting network behaviors of malware."", Security and Privacy in Communication Networks. Springer Berlin Heidelberg, 2010. 20-34.
Natvig, Kurt , "SANDBOXII: Internet", Virus Bulletin Conference, ("Natvig"), (Sep. 2002).

(56) References Cited

OTHER PUBLICATIONS

NetBIOS Working Group. Protocol Standard for a NetBIOS Service on a TCP/UDP transport: Concepts and Methods. STD 19, RFC 1001, Mar. 1987.

Newsome, J., et al., "Dynamic Taint Analysis for Automatic Detection, Analysis, and Signature Generation of Exploits on Commodity Software", In Proceedings of the 12th Annual Network and Distributed System Security, Symposium (NDSS '05), (Feb. 2005).

Newsome, J., et al., "Polygraph: Automatically Generating Signatures for Polymorphic Worms", In Proceedings of the IEEE Symposium on Security and Privacy, (May 2005).

Nojiri, D., et al., "Cooperation Response Strategies for Large Scale Attack Mitigation", DARPA Information Survivability Conference and Exposition, vol. 1, (Apr. 22-24, 2003), pp. 293-302.

Reiner Sailer, Enriquillo Valdez, Trent Jaeger, Roonald Perez, Leendert van Doorn, John Linwood Griffin, Stefan Berger., sHype: Secure Hypervisor Appraoch to Trusted Virtualized Systems (Feb. 2, 2005) ("Sailer").

Silicon Defense, "Worm Containment in the Internal Network", (Mar. 2003), pp. 1-25.

Singh, S., et al., "Automated Worm Fingerprinting", Proceedings of the ACM/USENIX Symposium on Operating System Design and Implementation, San Francisco, California, (Dec. 2004).

Spitzner, Lance, "Honeypots: Tracking Hackers", ("Spizner"), (Sep. 17, 2002).

The Sniffers's Guide to Raw Traffic available at: yuba.stanford.edu/.about.casado/pcap/section1.html, (Jan. 6, 2014).

Thomas H. Ptacek, and Timothy N. Newsham, "Insertion, Evasion, and Denial of Service: Eluding Network Intrusion Detection", Secure Networks, ("Ptacek"), (Jan. 1998).

U.S. Appl. No. 13/775,174, filed Feb. 23, 2013 Non-Final Office Action dated Feb. 20, 2015.

U.S. Appl. No. 13/775,174, filed Feb. 23, 2013 Notice of Allowance dated Aug. 11, 2015.

Venezia, Paul, "NetDetector Captures Intrusions", InfoWorld Issue 27, ("Venezia"), (Jul. 14, 2003).

Whyte, et al., "DNS-Based Detection of Scanning Works in an Enterprise Network", Proceedings of the 12th Annual Network and Distributed System Security Symposium, (Feb. 2005), 15 pages.

Williamson, Matthew M., "Throttling Viruses: Restricting Propagation to Defeat Malicious Mobile Code", ACSAC Conference, Las Vegas, NV, USA, (Dec. 2002), pp. 1-9.

\* cited by examiner

USER INTERFACE WITH REAL-TIME VISUAL PLAYBACK ALONG WITH SYNCHRONOUS TEXTUAL ANALYSIS LOG DISPLAY AND EVENT/TIME INDEX FOR ANOMALOUS BEHAVIOR DETECTION IN APPLICATIONS

CROSS-REFERENCE TO RELATED APPLICATIONS

This application is a continuation of U.S. patent application Ser. No. 13/775,174, filed Feb. 23, 2013, now U.S. Pat. No. 9,195,829 issued on Nov. 24, 2015, the entire contents of which are incorporated herein by reference.

FIELD

Embodiments of the invention relate to the field of application software testing. More specifically, one embodiment of the disclosure relates to a system, apparatus and method for providing a user interface to visually display, in real-time, event/time indexed video that illustrates simulated operations of an application undergoing anomalous behavior detection analysis and a textual log synchronized with the video in accordance with execution flow.

GENERAL BACKGROUND

Normally, malware features one or more programs or files that disrupt the operations of an infected electronic device, normally by attacking and adversely influencing its operations. In some instances, malware may, unbeknownst to the user, gather and transmit passwords and other sensitive information from the electronic device. In other instances, malware may alter the functionality of the electronic device without the user's permission. Examples of different types of malware may include bots, computer viruses, worms, Trojan horses, spyware, adware, or any other programming that operates within the electronic device without permission.

Over the last decade, various types of malware detection applications have been introduced in order to uncover the presence of malware within an electronic device, especially within software downloaded from a remote source and installed within the electronic device. However, these applications neither provide an ability to customize the behavioral analysis nor obtain the benefits of a real-time, interactive visual display of such analysis.

BRIEF DESCRIPTION OF THE DRAWINGS

Embodiments of the invention are illustrated by way of example and not by way of limitation in the figures of the accompanying drawings, in which like references indicate similar elements and in which.

DETAILED DESCRIPTION

Figure 1:
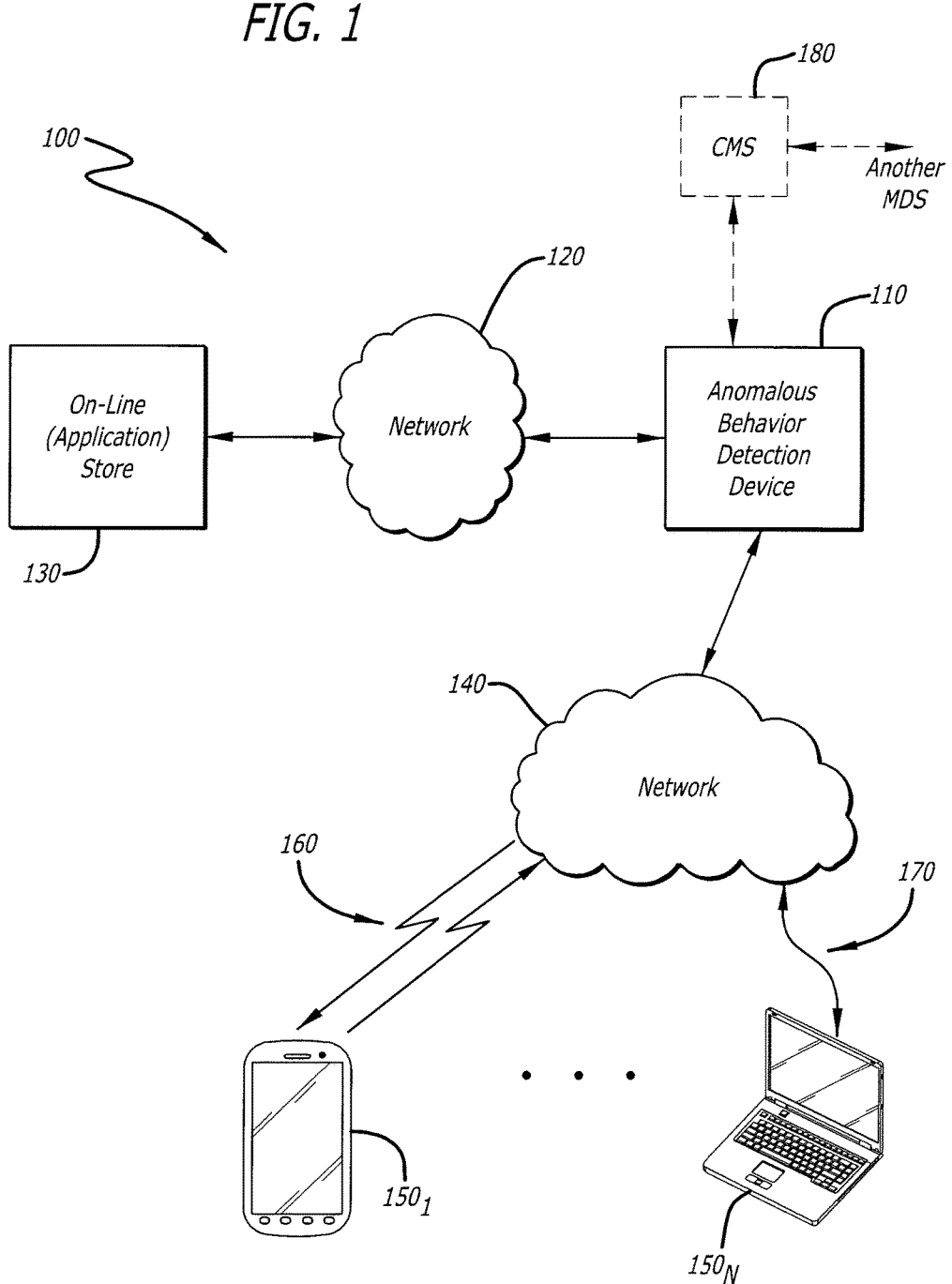
FIG. 1 is an exemplary block diagram of an embodiment of a communication system.

Various embodiments of the invention relate to a system, apparatus and method for providing a user interface to control a real-time visual display of an anomalous behavior detection analysis being conducted on simulated operations of application software running within a virtual machine (VM) emulated run-time test and observation environments (hereinafter virtual "run-time environment"). For example, according to one embodiment, the visual display may be video depicting the simulated operations during this detection analysis, where the video is synchronized with a textual log displayed with the video.

The video features a multiple order indexing scheme, where a first order of indexing permits a user, by user interaction, to access a particular segment of video in accordance with either a particular playback time in the video or a particular analyzed event. An example of an "analyzed event" is a test behavior, namely a particular behavior being monitored during the anomalous behavior detection analysis. The second order of indexing provides a user, during display of the video, information related to where the analyzed event occurs within the execution flow of the application software.

Hence, the video not only enables an administrator to visually witness anomalous behaviors that suggest the application software under test has malware, suspicious code or pernicious code, but also provides an administrator with evidence for use in policy enforcement and information to further refine (or harden) the anomalous behavior detection analysis and/or application software.

In the following description, certain terminology is used to describe features of the invention. For example, in certain situations, the terms "logic", "engine" and "unit" are representative of hardware, firmware or software that is configured to perform one or more functions. As hardware, logic may include circuitry such as processing circuitry (e.g., a microprocessor, one or more processor cores, a programmable gate array, a microcontroller, an application specific integrated circuit, etc.), wireless receiver, transmitter and/or transceiver circuitry, semiconductor memory, combinatorial logic, or other types of electronic components.

As software, logic may be in the form of one or more software modules, such as executable code in the form of an executable application, an application programming interface (API), a subroutine, a function, a procedure, an applet, a servlet, a routine, source code, object code, a shared library/dynamic load library, or one or more instructions. These software modules may be stored in any type of a suitable non-transitory storage medium, or transitory storage medium (e.g., electrical, optical, acoustical or other form of propagated signals such as carrier waves, infrared signals, or digital signals). Examples of non-transitory storage medium may include, but is not limited or restricted to a programmable circuit; a semiconductor memory; non-persistent storage such as volatile memory (e.g., any type of random access memory "RAM"); persistent storage such as non-volatile memory (e.g., read-only memory "ROM", power-backed RAM, flash memory, phase-change memory, etc.), a solid-state drive, hard disk drive, an optical disc drive, or a portable memory device. As firmware, the executable code is stored in persistent storage.

It is contemplated that an electronic device may include hardware logic such as one or more of the following: (i) processing circuitry; (ii) a communication interface which may include one or more radio units (for supporting wireless data transmission/reception) and/or a physical connector to support wired connectivity; (iii) a non-transitory storage medium; and/or (iv) a display. Types of electronic devices may include mobile electronic devices (e.g., cellular smartphones, tablets, laptop computers, netbooks, etc.), stationary electronic devices (e.g., desktop computers, servers, controllers, access points, base stations, routers, etc.) that are adapted for network connectivity.

The term "transmission medium" is a communication path between two or more electronic devices. The communication path may include wired and/or wireless segments. Examples of wired and/or wireless segments include electrical wiring, optical fiber, cable, bus trace, or a wireless channel using infrared, radio frequency (RF), or any other wired/wireless signaling mechanism.

The term "video" is generally defined as a series of successive display images, including VM-emulated graphical representations (screenshots) of operations that would have been displayed if an electronic device executed the application software under test ("test application") natively (e.g. if the application under test was executed on a mobile device OS). Hence, video may have a number of different formats, for example, a series of graphic images sequenced to represent a series of video frames; a series of compressed video frames in compliance with H.264, MPEG-2 or another video format; and a series of static images (such as slide show) that together define a time-based sequence. The video may even be vector-based graphic representations that collectively produce an animated sequence of images.

The term "anomalous behavior" is directed to an undesirable behavior occurring during execution of application software, where a behavior may be deemed to be "undesirable" based on customer-specific rules, manufacturer-based rules, or any other type of rules formulated by public opinion or a particular governmental or commercial entity. This undesired behavior may include (1) altering the functionality of the device executing that application software in a malicious manner (malware-based behavior); altering the functionality of the device executing that application software without any malicious intent (suspicious code-based behavior); and/or (3) providing an unwanted functionality which is generally acceptable in other context (pernicious code-based behavior). Examples of unwanted functionality by pernicious code may include tracking and/or disseminating user activity on the device (e.g., websites visited, email recipients, etc.), tracking and/or disseminating user location (e.g., global satellite positioning "GPS" location), privacy intrusion (e.g. accessing certain files such as contact lists), or the like.

For instance, as illustrative examples, an "anomalous behavior" may include a communication-based anomaly, such as an unexpected attempt to establish a network communication, unexpected attempt to transfer data (e.g., GPS data or other location data resulting in a privacy violation, contact lists, etc.), unexpected attempt to activate a video capture device (e.g., web camera), or unexpected activation of an audio capture device (e.g. microphone). Anomalous behavior also may include an execution anomaly, for example, an unexpected execution of computer program code, an unexpected Application Programming Interface (API) function call, an unexpected alteration of a registry key, or the like.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

As this invention is susceptible to embodiments of many different forms, it is intended that the present disclosure is to be considered as an example of the principles of the invention and not intended to limit the invention to the specific embodiments shown and described.

I. General Architecture

Referring to FIG. 1, an exemplary block diagram of an embodiment of a communication system 100 is shown. Communication system 100 comprises an anomalous behavior detection device 110 for testing the safety/security of application software such as mobile device application software for example. As shown, anomalous behavior detection device 110 is communicatively coupled via a transmission medium 120 to an on-line store 130, namely one or more servers operating as a source from which application software may be downloaded to anomalous behavior detection device 110.

Furthermore, anomalous behavior detection device 110 is communicatively coupled via a transmission medium 140 to one or more electronic devices 150$_1$-150$_N$ (N≥1). Through a graphics user interface (GUI) provided by anomalous behavior detection device 110, an administrator is able to (i) control the anomalous behavior detection analysis and (ii) watch, in real-time, VM-emulated operations of the test application in concert with analysis of the presence or absence of certain behaviors chosen to be monitored during such operations (hereinafter referred to as "test behaviors").

As shown in FIG. 1, electronic device(s) 150$_1$-150$_N$ may include an electronic device 150$_1$ communicatively coupled to transmission medium 140 via a wireless transmission medium 160. Alternatively, electronic device(s) 150$_1$-150$_N$ may include electronic device 150$_2$ (N=2) that is communicatively coupled to transmission medium 140 via a wired transmission medium 170. As shown, electronic device 150$_1$ is a dual-mode cellular telephone while electronic device 150$_N$ is a computer.

It is contemplated that communication system 100 may represent a dedicated anomalous behavior detection process for a particular network or subnetwork, being a part of a larger network. In such a deployment, anomalous behavior detection device 110 may be communicatively coupled to a central management system (CMS) 180, which communicatively couples communication system 100 along with other communication systems. This allows multiple communication systems to operate in tandem and exchange information as needed.

It is further contemplated that anomalous behavior detection device 110 may be deployed to provide cloud computing anomalous behavior detection services. Alternatively, anomalous behavior detection device 110 may be deployed as an appliance (electronic device) integrated as part of a local or enterprise network, or any combination thereof.

Figure 2:
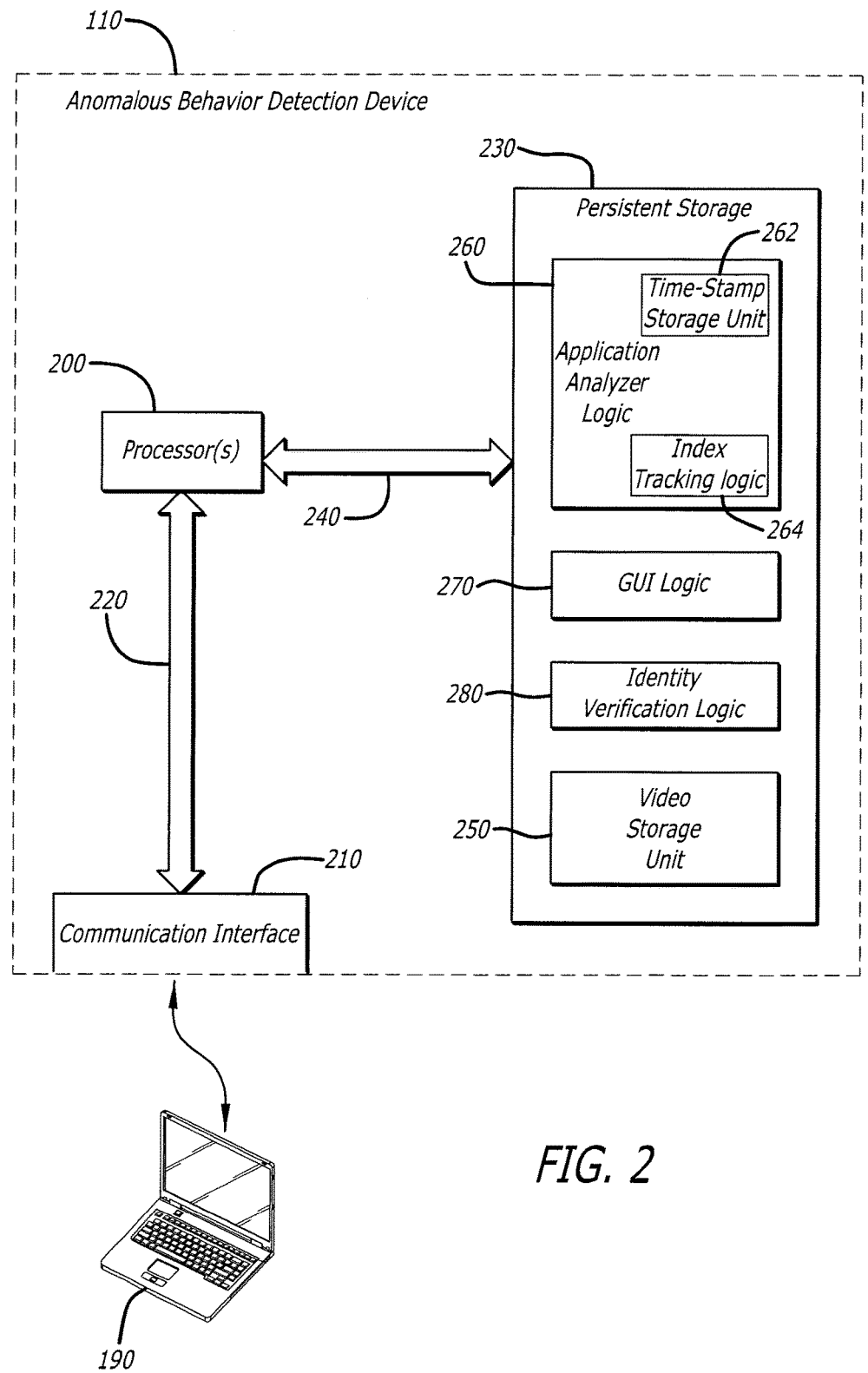
FIG. 2 is an exemplary block diagram of logic implemented within an anomalous behavior detection device being part of the communication system of FIG. 1.

Referring now to FIG. 2, an exemplary block diagram of logic that is implemented within anomalous behavior detection device 110 is shown. Anomalous behavior detection device 110 comprises one or more processors 200 that are coupled to a communication interface logic 210 via a first transmission medium 220. Communication interface 210 enables communications with other electronic devices over private and/or public networks, such as a display device 190 used to view the results of the anomalous behavior detection analysis. According to one embodiment of the disclosure, communication interface 210 may be implemented as a physical interface including one or more ports for wired connectors. Additionally, or in the alternative, interface 210 may be implemented with one or more radio units for supporting wireless communications with other electronic devices.

Processor 200 is further coupled to persistent storage 230 via transmission medium 240. According to one embodiment of the disclosure, persistent storage 230 may include video storage unit 250, application analyzer logic 260, graphics user interface (GUI) logic 270, and identity verification logic 280. Of course, when implemented as hardware logic, any of these logic/units 250, 260, 270 and/or 280 would be implemented separately from persistent memory 230.

Application analyzer 260 is adapted to conduct testing of the safety/security of application software, including mobile device application software. Such testing involves at least analysis of one or more test behaviors in response to a sequence of simulated (e.g. VM-emulated) operations performed by the test application. From the analysis of these test behaviors, anomalous behaviors may be detected.

During this testing, application analyzer 260 also generates video by capturing display images (or frames), on a continuous or periodic sampling basis, produced during simulated operations of the test application during the anomalous behavior detection analysis. As the anomalous behavior detection analysis at least partially involves analysis of a sequence of test behaviors, a time stamp is associated with at least a first display image (or frame) of a video segment for each test behavior being analyzed. This enables the video to be indexed by time and by test behavior. The time stamp along with information directed to the corresponding test behavior is stored within a time-stamp storage unit 262 accessible to application analyzer 260 while the video may be stored in video storage unit 250 for later review. Of course, time-stamps may be applied to every display image (or frame) to provide greater precision on the location within the video where analysis for particular test behaviors is conducted.

Additionally, application analyzer 260 features an index tracking logic 264 that is adapted to track and record which display images (or frames) of the video corresponds to a particular test behavior being analyzed. For example, it is contemplated that index tracking logic 264 may include a table where each entry maintains an identifier (or index) associated with a particular display image (or frame) along with a corresponding identifier (or index) associated with a particular aspect of the test behavior being analyzed. As a result, the display of the video is synchronized with the display (and illustrated progress) of the analyzed test behaviors.

Furthermore, after completion of this testing, application analyzer 260 assigns a threat score to the test application. The threat score, ranging between minima and maxima values (e.g., 0-10), represents the severity of the test behavior(s) detected during the anomalous behavior detection analysis. In other words, the threat score may be considered to represent the amount of potential harm that detected anomalous behavior(s) may cause an electronic device executing that test application.

As further shown in FIG. 2, GUI logic 270 provides user interface screen displays for controlling the operational state of application analyzer 260 as describe above. As examples, GUI logic 270 enables user-control of the anomalous behavior detection analysis by producing a behavior selection display screen (see FIG. 8A) and a behavior ordering display screen (see FIG. 8B). The behavior selection display screen enables user interaction as to the particular test behaviors for application analyzer 260 to monitor during simulation operations of the test application. The behavior ordering display screen allows the user to place these behaviors into a particular sequence or grouping. Also, GUI logic 270 produces user interface display screens to convey the anomalous behavior analysis results, including real-time display of (i) video representing simulated operations of the test application in concert with analysis of the presence or absence of anomalous behaviors and/or (ii) textual log synchronized with the display of the video to show the progress and completion of the analyzed events and execution flow. In some embodiments, GUI logic 270 generates, for display contemporaneously (i.e., in a temporally overlapping manner) with the video, a textual log that provides information as to when each event occurs within an execution flow of the operations of the test application; and provides, during playback of the video on screen, reciprocal graphic interaction between the displayed video and the displayed textual log responsive to a user input.

Identity verification logic 280 is used to control authentication of users seeking to access application analyzer 260. Furthermore, identity verification logic 280 may set access privileges for each authenticated user, as certain users may have restricted access to only certain functionality offered by application analyzer 260. As an example, one user may have access to replay video stored in video storage unit 250, but is unable to initiate anomalous behavior analysis testing on application software. Another administrator may have complete access to all functionality offered by application analyzer 260.

Figure 3:
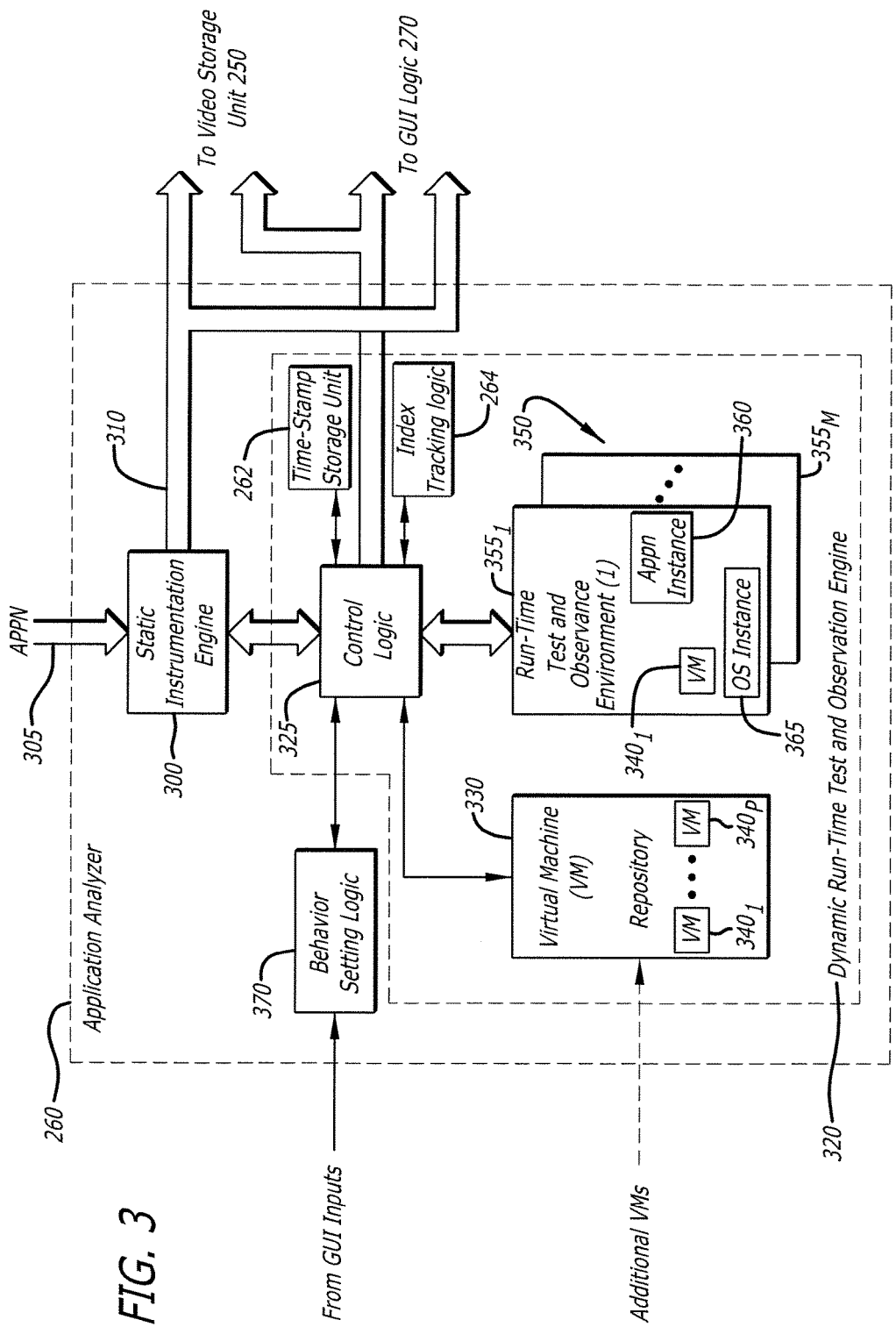
FIG. 3 is an exemplary block diagram of logic within the application analyzer of FIG. 2.

Referring now to FIG. 3, an exemplary block diagram of logic within application analyzer 260 of FIG. 2 is shown. Herein, application analyzer 260 comprises (1) static instrumentation engine 300; (2) Dynamic run-time test and observation (RTO) engine 320, and (3) behavior setting logic 370. As shown, static instrumentation engine 300 and dynamic RTO engine 320 are deployed within the same device. However, it is contemplated that static instrumentation engine 300 and dynamic RTO engine 320 may be employed within different devices and/or executed by different processors when implemented as software.

Static instrumentation engine 300 receives a test application (APPN) 305 and generates a representation of the test application 300 that is analyzed with one or more various software analysis techniques (e.g., control information analysis, or data analysis). Static instrumentation engine 300 then modifies the application code itself to include within itself special monitoring functions and/or special stimuli functions operable during execution of the test application in dynamic run-time test and observation engine 320. The monitoring functions report their results to the control logic 325 and the stimuli functions are told what stimuli to generate by control logic 325. During such analysis by static instrumentation engine 300, video 310 is captured and/or other graphics related to the analysis is generated and provided to GUI logic 270 to produce one or more user interface display screens. Furthermore, video 310 is stored in video storage unit 250 for subsequent playback.

It is contemplated that static instrumentation engine 300 may be adapted to receive information from dynamic RTO engine 320 in order to instrument the code to better analyze specific behaviors targeted in the heuristics and/or probability analysis.

After processing is completed by static instrumentation engine 300, test application 305 is then provided to control logic 325 within dynamic RTO engine 320. Control logic 325 operates as a scheduler to dynamically control the anomalous behavior detection analysis among different applications and/or the same application software among different virtual run-time environments. Furthermore, control logic 325 maintains time-stamp storage unit 262 and index tracking logic 264 as previously described.

In general, dynamic RTO engine 320 acts as an intelligent testing function. According to one approach, dynamic RTO engine 320 recursively collects information describing the current state of test application 305 and selects a subset of rules, corresponding at least in part to the test behaviors set by the user, to be monitored during virtual execution of test application 305. The strategic selection and application of various rules over a number of recursions in view of each new observed operational state permits control logic 325 to resolve a specific conclusion about test application 305, namely a threat score denoting whether the application is "safe" or "unsafe".

As shown in FIG. 3, dynamic RTO engine 320 comprises a virtual machine repository 330 that is configured to store one or more virtual machines $340_1$-$340_P$ (where P≥1). More specifically, virtual machine repository 330 may be adapted to store a single virtual machine (VM) that can be configured by scheduling functionality within control unit 325 to simulate the performance of multiple types of electronic devices. Virtual machine repository 330 also can store any number of distinct VMs each configured to simulate performance of a different electronic device and/or different operating systems (or versions) for such electronic devices.

One or more virtual run-time environments 350 simulate operations of test application 305 to detect anomalous behavior produced by this application. For instance, run-time environment $355_1$ can be used to identify the presence of anomalous behavior during analysis of simulated operations of test application 305 performed on a virtual machine $340_1$. Of course, there can be multiple run-time environments $355_1$-$355_M$ (M≥2) to simulate multiple types of processing environments for test application 305.

A virtual machine may be considered a representation of a specific electronic device that is provided to a selected run-time environment by control unit 325. In one example, control unit 325 retrieves virtual machine $340_1$ from virtual machine repository 330 and configures virtual machine $340_1$ to mimic an Android® based smart phone. The configured virtual machine $340_1$ is then provided to one of the run-time environments $355_1$-$355_M$ (e.g., run-time environment $355_1$).

As run-time environment $355_1$ simulates the operations of test application 305, virtual machine $340_1$ can be closely monitored for any test behaviors set by the user (or set by default) in behavior setting logic 370. By simulating the operations of test application 305 and analyzing the response of virtual machine $340_1$, run-time environment $355_1$ can identify known and previously unidentified anomalous behavior and report the same through the indexed video and a dynamic textual log.

Besides VM $340_1$, run-time environment $355_1$ is provided test application 305 along with an instance 360 of test application (App) an instance 365 of the type of operating system on which target application 305 will run if deemed sufficiently safe during the dynamic anomalous behavior detection process. Here, the use of virtual machines (VMs) permits the instantiation of multiple additional run-time environments $355_1$-$355_M$ each having its own test application and OS instance, where the various run-time environments $355_1$-$355_M$ are isolated from one another.

As previously described, the simultaneous existence of multiple run-time environments $355_1$-$355_M$ permits different types of observations/tests to be run on a particular test application. That is, different instances of the same test application may be provided in different run-time environments so that different types of tests/observances can be concurrently performed on the same application. Alternatively, different test applications can be concurrently tested/observed.

For instance, a first application may be tested/observed in a first run-time environment (e.g., environment $355_1$) while a second, different application is tested/observed in another run-time environment (e.g., environment $355_M$). Notably, instances of different operating system types and even different versions of the same type of operating system may be located in different run-time environments. For example, an Android® operating system instance 365 may be located in first run-time test environment $355_1$ while an iOS® operating system instance (not shown) may be located in a second run-time test environment $355_M$. Concurrent testing of one or more test applications (whether different instances of the same application or respective instances of different applications or some combination thereof) enhances the overall performance of the communication system.

II. Anomalous Behavior Analysis and Video Generation/Playback

Figure 4A:
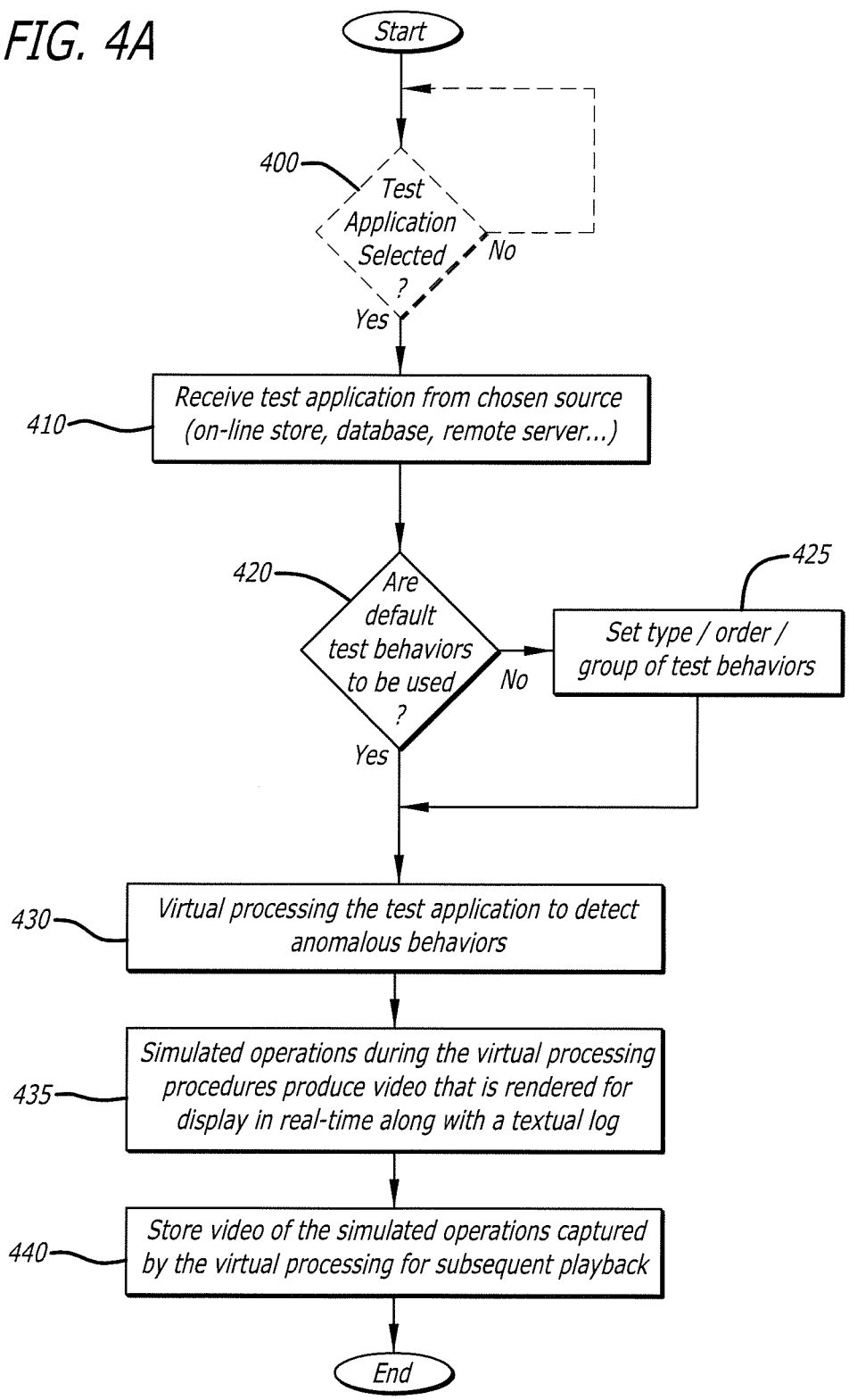
FIG. 4A is an exemplary diagram of a flowchart partially illustrating the anomalous behavior detection analysis conducted by the application analyzer to generate, in real time, a video of simulated operations of a targeted software application in order to detect particular anomalous behaviors.

Referring to FIG. 4A, an exemplary diagram of a flowchart partially illustrating anomalous behavior detection analysis conducted by the application analyzer, which generate, in real time, video that may capture anomalous behavior detected in response to simulated operations of the test application and may provide a visual correlation of the anomalous behavior with the video segment at which it occurred. However, prior to conducting this anomalous behavior analysis, the anomalous behavior detection device receives a message from an electronic device requesting access to the application analyzer. In response, a first user interface (login) display screen (see FIG. 5) is provided by GUI logic within the anomalous behavior detection device. After authentication of the user operating the electronic device and/or the electronic device initiating the request message, the GUI logic fetches heuristic data related to operations previously and currently being performed by the application analyzer. Such heuristic data is provided to the GUI logic to generate textual and/or visual representations displayed in a second user interface (dashboard) display screen (see FIG. 6).

Next, upon user interaction with the second user interface display screen (e.g. selection by the user of a particular object), the GUI logic provides a third user interface display screen (See FIGS. 7A-7C) that enables a user to select the test application, which may be uploaded from a web server (or an application database accessible to the application analyzer), or retrieved by searching an on-line store for that application (block 400). Once the test application is received by the application analyzer, a determination is made as to whether default test behaviors are to be used for the anomalous behavior detection analysis (blocks 410 and 420). If not, the GUI logic provides user interface display screens that enable modification of the test behaviors through user interaction (e.g. by selecting and deselecting listed behaviors that are available for analysis as well as altering the sequence order or groupings in the analysis of the behaviors) as set forth in block 425.

Once the test behaviors for the anomalous behavior detection analysis are set, the application analyzer virtually processes the test application to detect anomalous behavior (block 430). The simulated operations conducted during the virtual processing of the test application produce video, which is sent to the GUI logic for rendering a fourth user interface display screen in real time (block 435). Additionally, a textual log providing information as to what events (e.g., test behaviors) are being analyzed and when the analyzed events occur within the execution flow of the application software. This information may be provided through the placement and ordering of display objects corresponding to test behaviors alongside the video corresponding to the order of display images (or frames) rendered during the simulated operations of the test application.

As a result, progress changes in the anomalous behavior analysis displayed by the video are synchronized with progress changes shown by the textual log. Concurrently with or subsequent to the supply of the video to the GUI logic, the video is provided to video storage unit for storage and subsequent retrieval for playback (block 440).

Figure 4B:
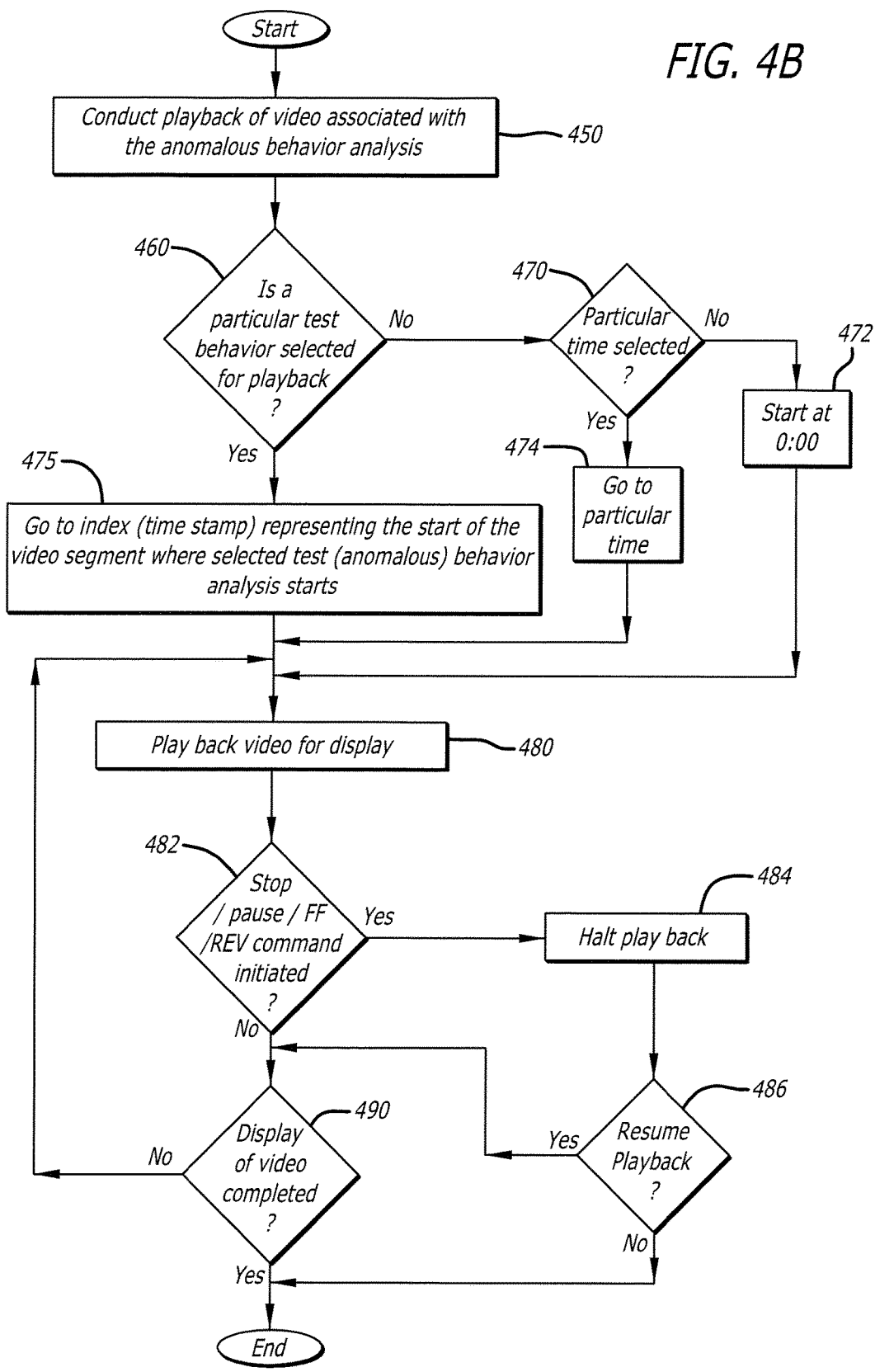
FIG. 4B is an exemplary diagram of a flowchart partially illustrating the anomalous behavior detection analysis conducted by the application analyzer to display the video of the simulated operations which is searchable/indexed according to particular anomalous behaviors.

Referring to FIG. 4B, an exemplary diagram of a flowchart partially illustrating the replay of video produced by the application analyzer performing anomalous behavior detection analysis is shown, where the video is indexed according to the particular test behaviors. As illustrated, upon conducting playback of video associated with the anomalous behavior analysis conducted on the test application, a determination is made whether the playback is directed to viewing a particular test behavior (blocks 450 and 460). If not, the video commences playback at the beginning or at an elapsed start time selected by the user (blocks 470, 472 and 474). However, if the playback is directed to viewing video associated with a particular test behavior, the application analyzer accesses a time stamp associated with a first frame for a video segment corresponding to the test behavior and uses the time-stamp to index a starting point for the video playback (block 475).

Thereafter, playback of the video continues unless disrupted by video playback alternation events (e.g., Pause, Stop, Fast-Forward, Reverse, etc.) in which playback of the video is haltered to service these events (blocks 480, 482, 484 and 486). Once playback of the video has completed, this playback session ends (block 490). The user may be provided the opportunity to commence a new playback session or select another video.

III. User Interface Display Screens to Control the Application Analyzer

Figure 5:
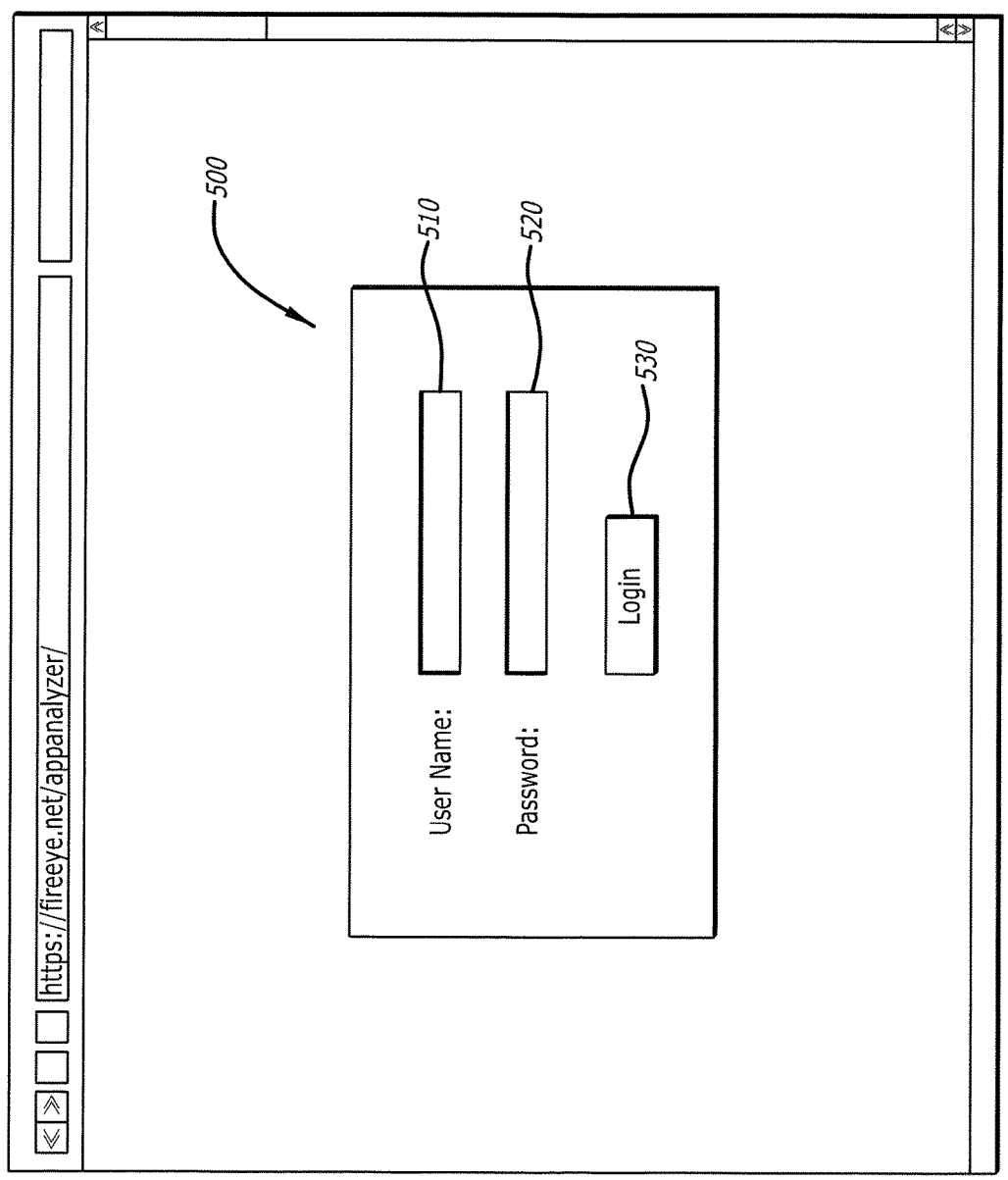
FIG. 5 is an exemplary embodiment of a user interface produced by the application analyzer of FIG. 3 to obtain access privileges to anomalous behavior processes.

Referring now to FIG. 5, an exemplary embodiment of a first user interface (Login) display screen 500 produced by application analyzer 260 of FIG. 3 is shown. Herein, in order to gain access to the application analyzer to perform anomalous behavior detection analysis, the user initially establishes a network connection with the anomalous behavior detection device. This network connection may be established in accordance Hypertext Transfer Protocol (HTTP) Request or HTTP Secure (HTTPS) communication protocols.

As shown, an initial request for access to the application analyzer is redirected to login display screen 500 that features at least two entry fields; namely a User Name 510 and a Password 520. The User Name entry field 510 requires the user to enter a registered user name in order to identify the user seeking access to the application analyzer. Password entry field 520 allows the user to enter his or her password.

Once a login object 530 is selected by the user, the user name and password are provided to identity verification logic 280 of FIG. 2 within anomalous behavior detection device 110. Once the user is verified by identity verification logic 280, access privileges for that user are set and the user is provided with a second user interface display screen 600 as shown in FIG. 6.

Figure 6:
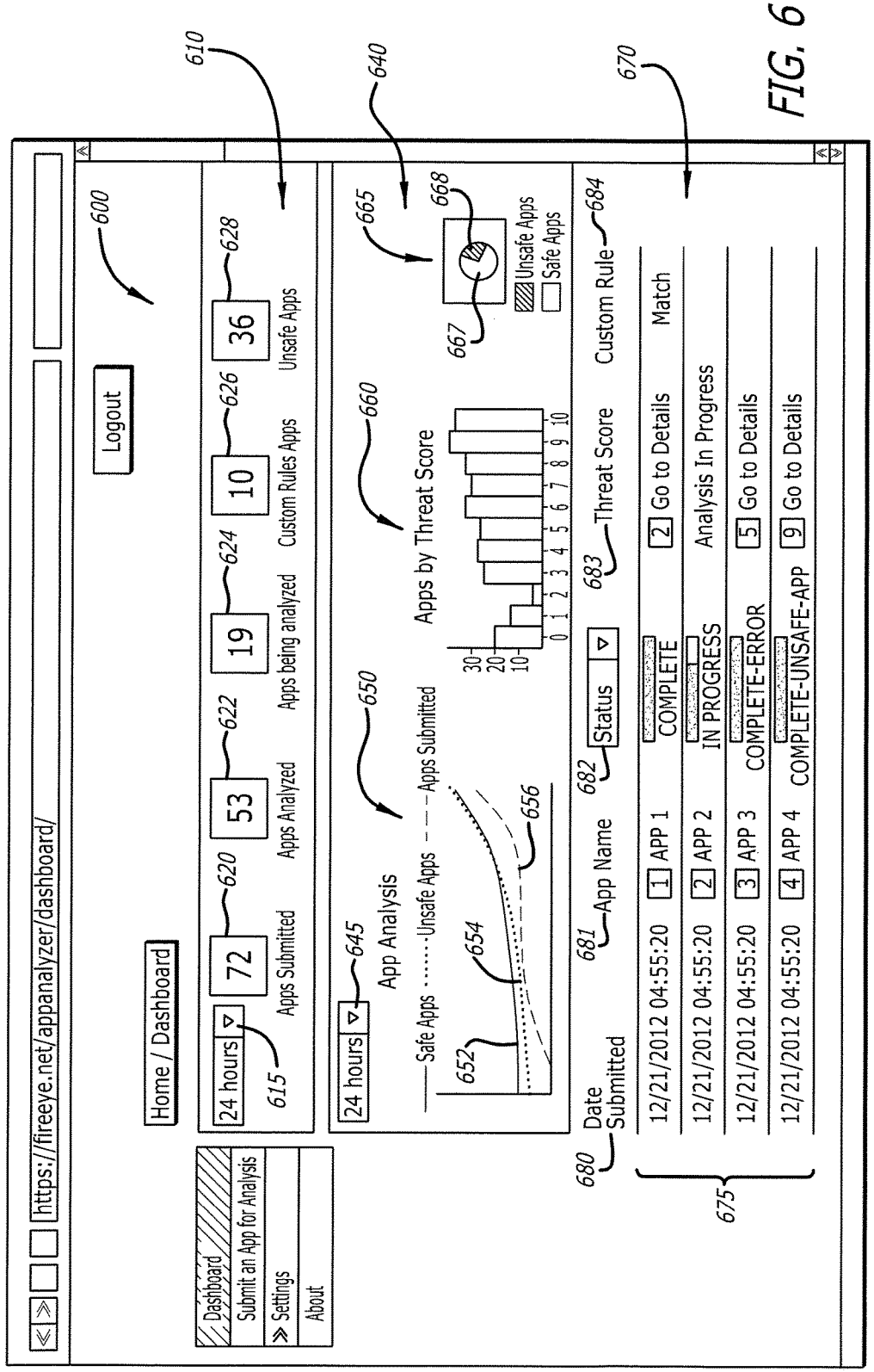
FIG. 6 is an exemplary embodiment of a user interface produced by the application analyzer of FIG. 3 to operate as a dashboard for the anomalous behavior detection analysis.

As shown in FIG. 6, an exemplary embodiment of second user interface display screen 600 produced by the application analyzer of FIG. 3 to operate as a dashboard is shown. Herein, dashboard display screen 600 comprises a plurality of areas 610, 640 and 670 that display results of anomalous behavior analysis testing over a selected time period.

For instance, first area 610 displays a plurality of objects that provide information directed to application software that has been analyzed or are currently being analyzed with a first selected time period (24 hours). Provided by the application analyzer to the GUI logic for rendering, the information associated with these objects identifies: (1) number of applications submitted (object 620); (2) number of applications analyzed (object 622); (3) number of applications currently being analyzed (object 624); (4) number of applications analyzed according to customized rule settings (object 626); and (5) the number of "unsafe" applications detected (object 628). Some or all of these numeric values are stored for a period of time that may be set by the manufacturer or the user.

It is contemplated that the first selected time period may be adjusted through a drop-down list 615 that features multiple time periods using the current time as a reference (e.g., 24 hours ago, 1 week ago, 1 month ago, 3 months ago, 1 year ago, etc.). However, although not shown, drop-down list 615 may also feature user interaction to select the start and end time periods for the first selected time period.

Second area 640 provides graphical depictions of application software analyzed over a second selected time period 645, which may differ from the selected time period for first display area 610. As shown, a first graphical depiction 650 represents a line graph that identifies different categories of analyzed applications (vertical axis) analyzed at different times within the selected time period (horizontal axis). The different categories include (1) "safe" applications 652 (applications with a threat score not greater than a predetermined threshold); (2) unsafe applications 654 (applications with a threat score greater than the predetermined threshold); and (3) applications submitted for analysis 656.

A second graphical depiction 660 represents a bar graph directed to applications that have completed their anomalous behavior analysis testing. For this bar graph, the horizontal axis represents the measured threat score (0-10) while the vertical axis represents the number of analyzed applications associated with the measured threat score.

A third graphical depiction 665 represents a pie chart also directed to applications that have completed their anomalous behavior analysis testing. A first color 667 denotes those applications having a threat score indicating the application is considered "safe" for use while a second color 668 denotes those applications having a threat score that identifies them as being "unsafe" for use.

Third area 670 provides a graphical and/or textual depiction entry 675 for each application that has been analyzed or is in the process of being analyzed. Each entry 675 includes a plurality of parameters, including at least three or more of the following: (1) date the application was submitted 680; (2) application name 681; (3) status (safe, unsafe, complete with error, in progress) 682; (4) threat score 683; and (5) custom rule matching status 684. The order of these entries can be adjusted according to submission date, alphabetically by application name, status and threat score.

With respect to the status parameter 682, currently, there are four status levels. As previously mentioned, "safe" is a status level assigned to applications having a threat score no greater than a predetermined threshold while "unsafe" is a status level assigned to applications having a threat score greater than the predetermined threshold, normally indicating the presence of malware or some sort of suspicious or pernicious code causes behaviors unsuitable for the targeted device. Another status level is "in progress" which indicates that the corresponding application is currently undergoing the anomalous behavior analysis. Lastly, "complete-error" is a status level which identifies that an anomalous behavior has been detected, but the risk level may widely vary depending on the particular customer.

For instance, as an illustrative example, for application software that establishes a network connection to a server for upgrades, without any malicious intent, the assigned level of risk would be minimal for most clients. However, where the electronic device is for use by a high-ranking governmental official, any unknown network connectivity may be assigned a high risk. Hence, the test application is assigned to "complete-error" status with medium threat score upon detecting a test behavior that is considered by the anomalous behavior detection analysis as being customer dependent. This status level encourages user interaction (e.g., select "Go To Details" link located next to the threat score) to obtain a more detailed explanation of the findings associated with the threat score, although more detailed explanations are provided for all status levels.

Figure 7A:
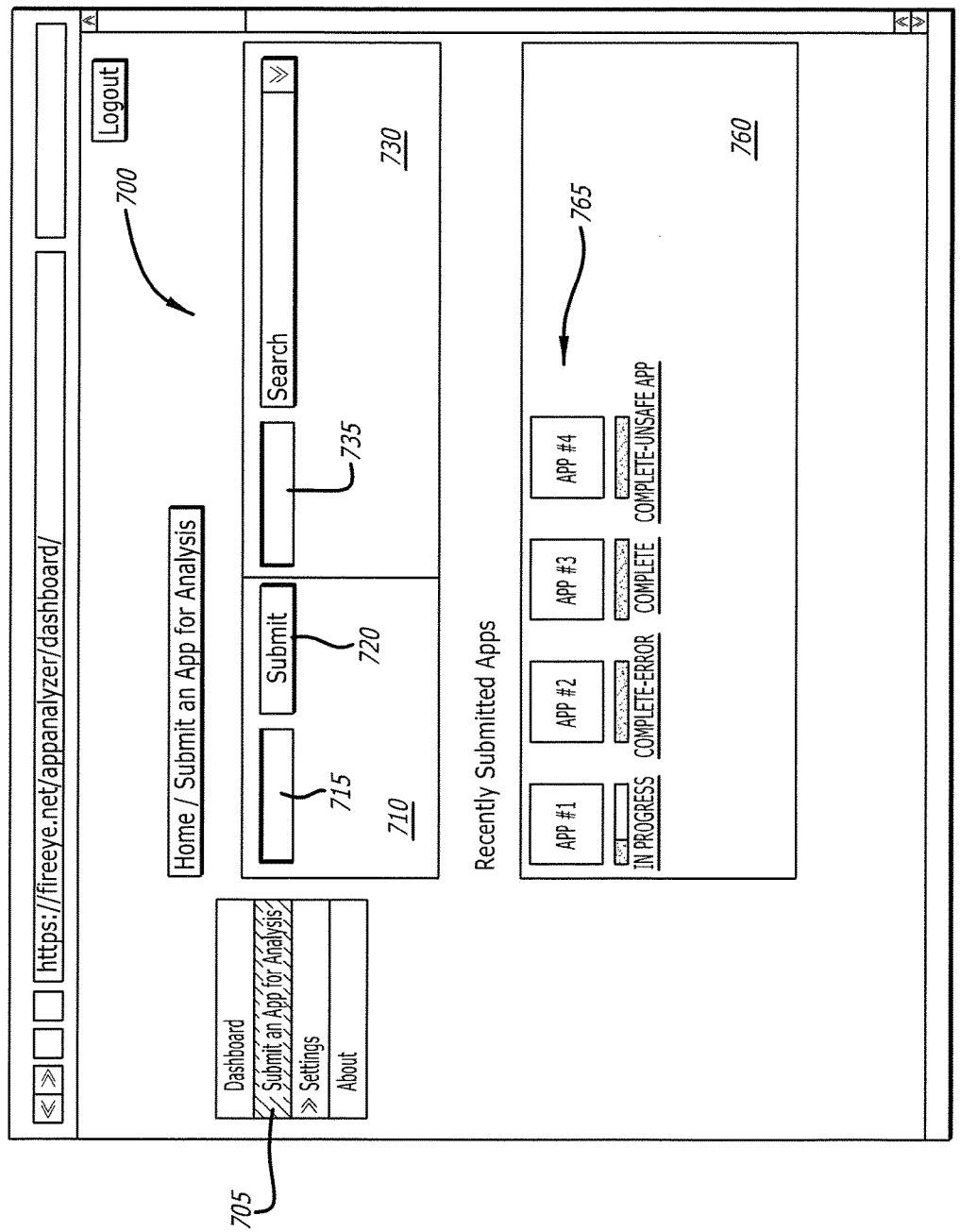
FIG. 7A is an exemplary embodiment of a user interface produced by the application analyzer of FIG. 3 to upload an application or search for an application in an on-line store to be analyzed for anomalous behavior.
Figure 7B:
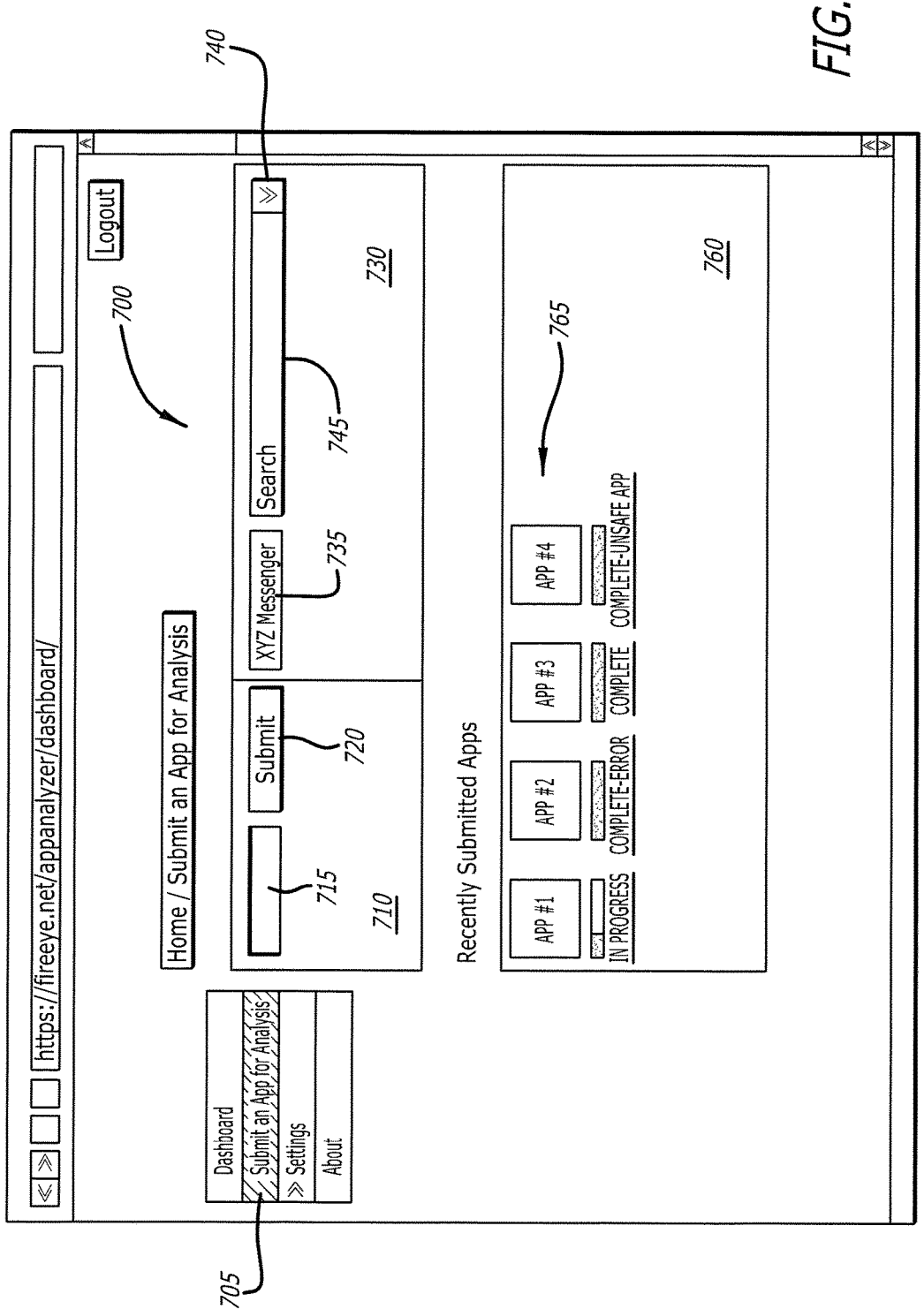
FIG. 7B is an exemplary embodiment of a user interface produced by the application analyzer of FIG. 3 in which a search within one or more on-line stores is conducted for one or more versions of the "XYZ Messenger" application.
Figure 7C:
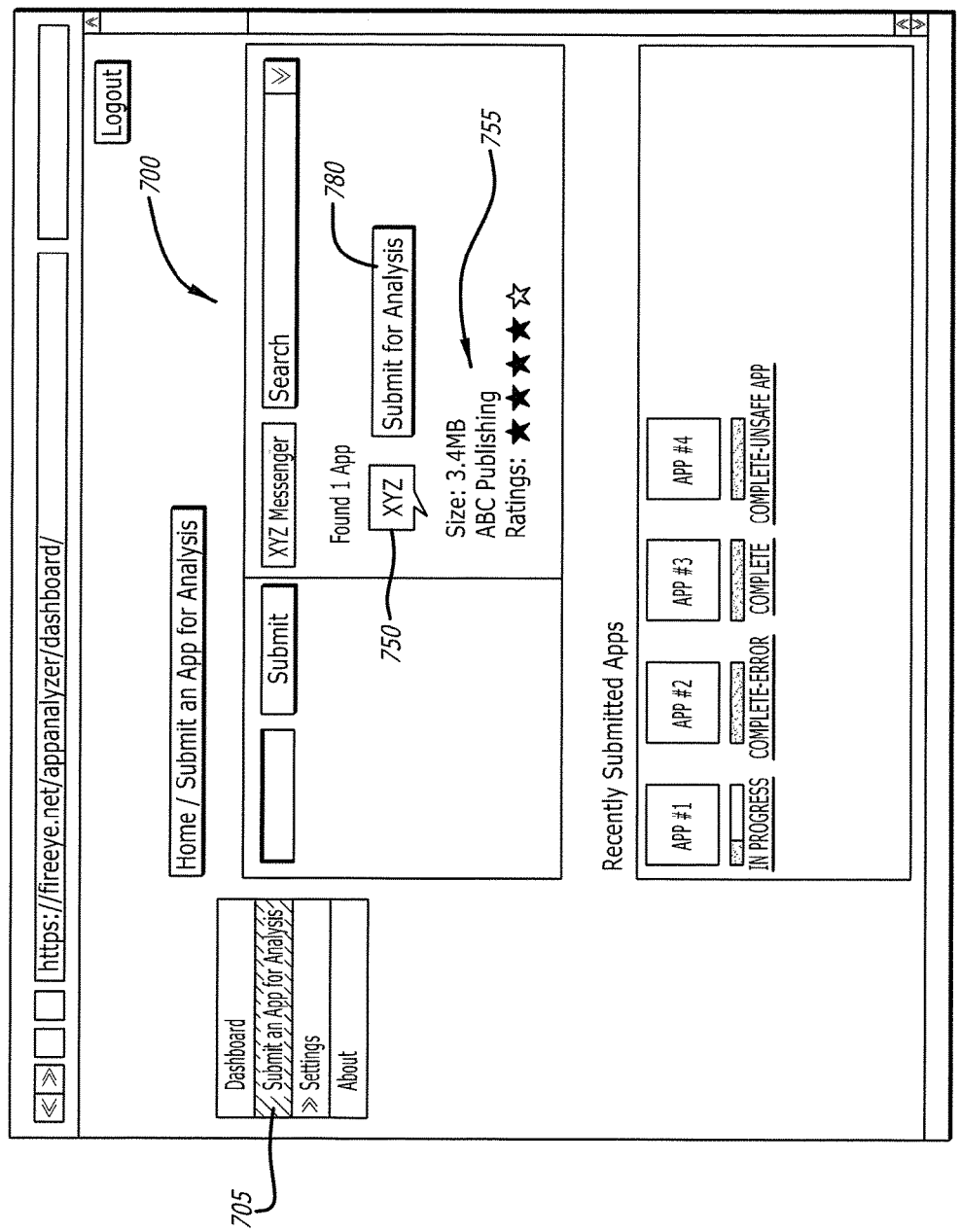
FIG. 7C is an exemplary embodiment of a user interface produced by the application analyzer of FIG. 3 that identifies the "XYZ Messenger" application being located within the on-line store(s) for use as the test application for the anomalous behavior detection analysis.

Referring now to FIGS. 7A-7C, exemplary embodiments of a third user interface display screen 700, which is produced by the application analyzer to provide upload and search capabilities for the test applications to be analyzed for anomalous behavior, is shown. Herein, FIG. 7A illustrates screen display 700 that is generated in response to user interaction (e.g. selection of a particular menu object 705). According to this embodiment of the disclosure, third user interface display screen 700 comprises an upload display area 710, a search display area 730 and a submission area 760.

Upload display area 710 enables the user to enter addressing information (e.g. Uniform Resource Locator "URL", File Transfer Protocol "FTP" address, etc.) with an input field 715. Thereafter, once the "Submit" object 720 is selected, an HTTP Request message is sent in order to fetch the test application from the website or database specified by the addressing information.

Search display area 730 features an input field 735 into which the user can enter the name (or at least a portion of the name) of the test application. For instance, as shown in FIG. 7B, application software entitled "XYZ Messenger" is input into input field 735. A drop-down list 740 enables the user to select from a list of on-line stores from which to search and acquire the XYZ Messenger as the test application. These on-line stores may include Google® Play® store, Apple® App Store™, Amazon® Appstore, Windows® Phone store or BlackBerry® World™ app store, or combinations of such on-line stores. After entering at least a portion of the application name and selecting the on-line store, a "Search" object 745 is selected. This activates a web browser to search for the identified application software at websites associated with the selected on-line store(s).

Referring to FIG. 7C, if the on-line store has a copy of the test application, the test application is returned and displayed as object 750 as shown in FIG. 7C along with metadata 755 associated with the test application (e.g., publisher name, size, version type, OS type supported, or user rating). It is contemplated that, if the on-line store has multiple versions of the test application (XYZ Messenger), all versions are returned to the application analyzer and displayed. This allows the user interaction as to the particular version to undergo anomalous behavior analysis, and based on certain activity, such upon selecting the "Submit for Analysis" object 780, the anomalous behavior analysis of the test application begins. This enables the user to upgrade and downgrade applications to whatever version is desired by the user.

Referring back to FIG. 7A, submission area 760 displays objects 765 that identify applications that have been analyzed for anomalous behavior or are currently being analyzed for anomalous behavior. It is contemplated that, based on user interaction, each of these objects may extract either (1) a website (or server address) from which the application was obtained along with the application name (and perhaps its version number) for insertion into input field 715 or (2) the application name (and perhaps its version number) for insertion into input field 735. This enables the user to conduct searches for updates to the particular application software without having to re-enter information to locate that application.

Figure 8A:
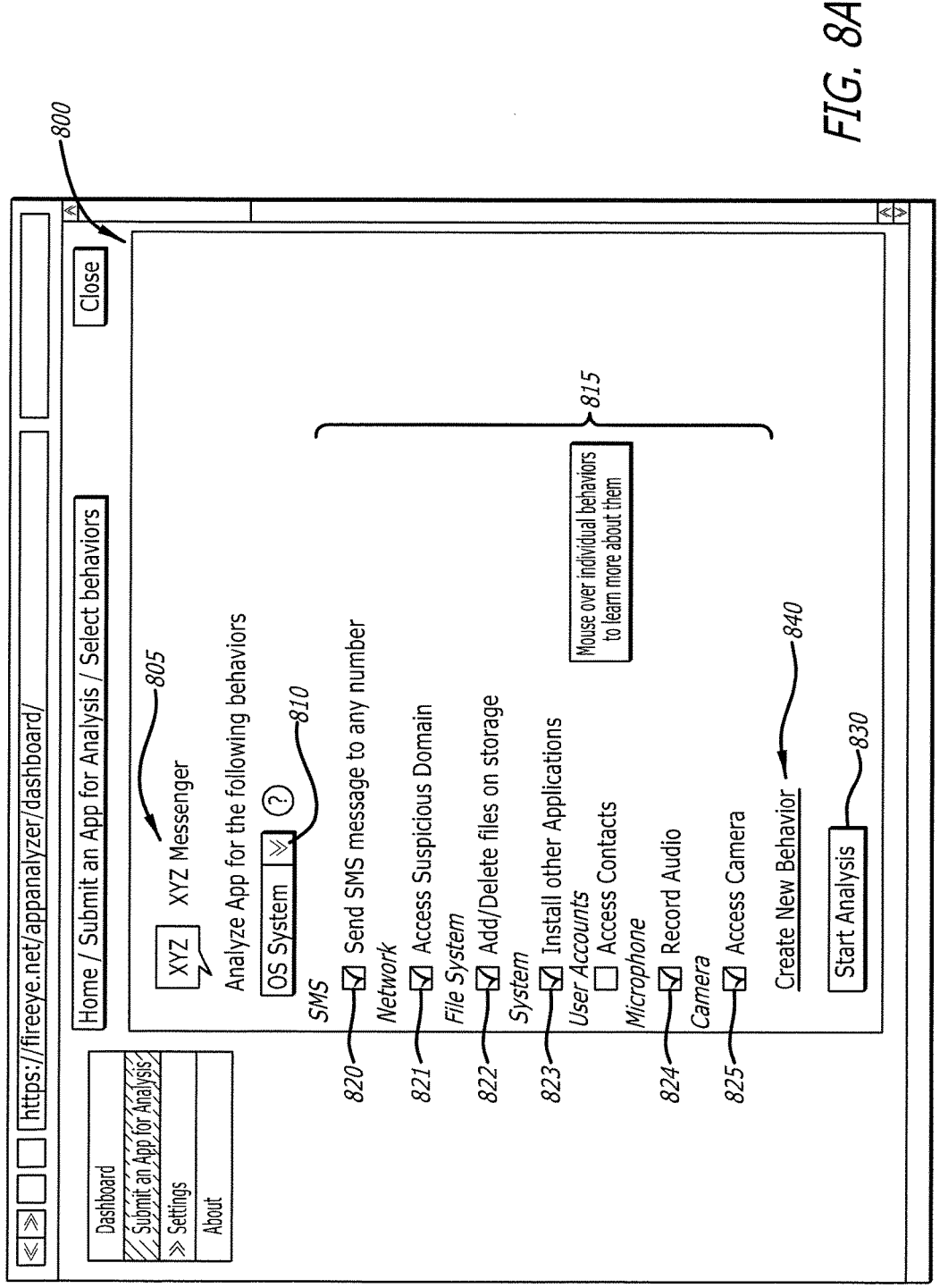
FIG. 8A is an exemplary embodiment of a user interface produced by the application analyzer of FIG. 3 that lists user-interaction test behaviors for analysis.

Referring now to FIG. 8A, an exemplary embodiment of a behavior display screen 800 produced by application analyzer 260 of FIG. 3 that lists selectable test behaviors for anomalous behavior analysis is shown. In response to user interaction (e.g., after selecting the "Submit" object 720 within upload display area 710 or "Search" object 745) and upon retrieval of the test application, application analyzer uploads available test behaviors into the GUI logic to produce behavior display screen 800. As shown, behavior display screen 800 comprises information 805 to identify the test application, a drop-down list 810 identifying a selected operating system (e.g., Android® 4.2) to be emulated by the VM when conducting the anomalous behavior analysis testing, and a listing of test behaviors 815 supported by the application analyzer.

For ease of illustration, only some of the test behaviors are set forth in FIG. 8A. As a default setting, certain test behaviors are pre-selected for anomalous behavior analysis, although it is contemplated that each listed test behavior may be subsequently selected or deselected by the user. Examples of the test behaviors are shown below in Table A, by category and behavior description.

TABLE A

| Category | Behavior Description |
| --- | --- |
| PHONE | Incoming/outgoing call notification |
|  | Make/receive calls |
| SMS | Send SMS to any number |
|  | Send SMS to premium number |
|  | Receive SMS (or be notified of incoming/outgoing messages) |
|  | Modify/delete SMS |
|  | Leak SMS contents |
| NETWORK | Access suspicious domain |
| LOCATION | Access coarse location |
|  | Access fine location |
|  | Leak geo-location |
| USER ACCOUNTS | Access multimedia (photos/videos/documents) |
|  | Leak contacts |
| CAMERA | Access camera |
| MICROPHONE | Leak recorded audio |
|  | Record audio |
| BLUETOOTH/NFC | Access Bluetooth/NFC device |
|  | Pair with external devices |
| FILESYSTEM | Add/delete files on storage |
|  | Execute arbitrary files |
|  | Modify system folder contents |
| FRAMEWORK | Bypass framework/access internal APIs |
|  | Access kernel drivers |
| SYSTEM | Install other apps |
|  | Wipe user data |
|  | Wipe cache |
|  | Access data of other apps |
|  | Gain root access |
| Custom | Custom sequence #1 |

As further shown in FIG. 8A, six (6) test behaviors are set for the anomalous behavior detection analysis, namely (1) send Short Message Service (SMS) message to any number 820; (2) access suspicious domain 821; (3) add/delete files in local storage 822; (4) install other applications 823; (5) record audio 824; and (6) access camera 825. After the test behaviors are set, based on user interaction (e.g., the user selects the "Start Analysis" object 830), the anomalous behavior detection analysis commences.

Figure 8B:
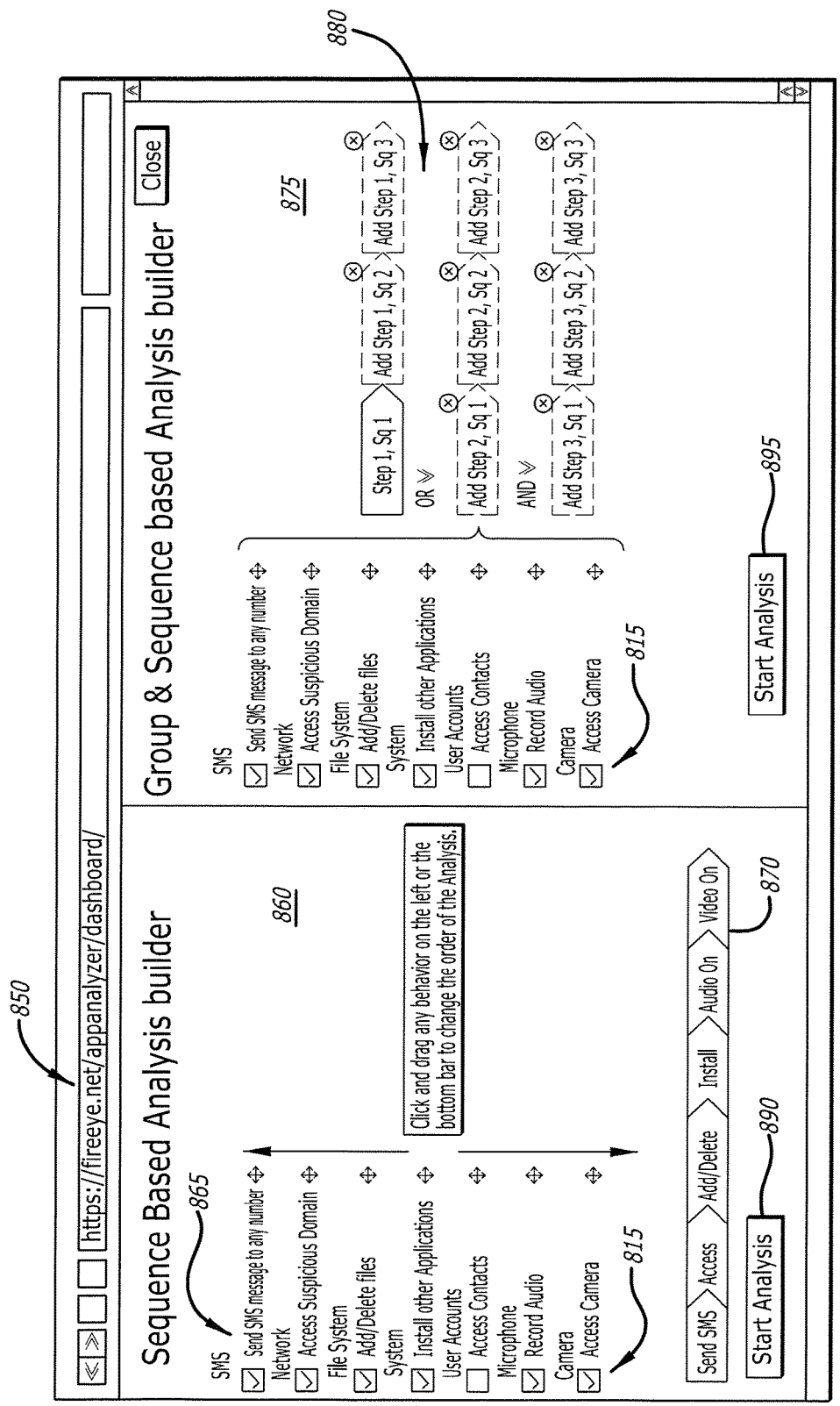
FIG. 8B is an exemplary embodiment of a user interface produced by the application analyzer of FIG. 3 that provides a user-interactive mechanism for sequencing and/or grouping anomalous behaviors for analysis.

As further shown in FIG. 8A, based on user interaction (e.g. selection of the "create new behavior" link 840), the user-interactive display screen is provided for sequencing and/or grouping of test behaviors for analysis, as shown in FIG. 8B.

Referring to FIG. 8B, an exemplary embodiment of a behavior group/sequence display screen 850 produced by the application analyzer of FIG. 3 is shown. As shown, display screen 850 provides a user-interaction mechanism for sequencing and/or grouping test behaviors for analysis. The sequence and/or grouping are used by the application analyzer to customize when test behaviors are monitored during simulated operations of the test application in one or more run-time environments.

More specifically, sequence based analysis builder 860 provides a listing 865 of test behaviors chosen by the user as illustrated in FIG. 8A and allows the user to click and drag any test behavior 815 within listing 865 to alter its position within the listing. The sequence order of the test behaviors (from top-to-bottom) defines the order of processing as represented by a textual and graphical representation 870.

Similarly, group & sequence based analysis builder 875 enables use of test behaviors 815 to formulate groupings using logical operators (AND, OR) 880. Test behaviors 815 may be dragged into position along with logical operators 880.

Figure 9:
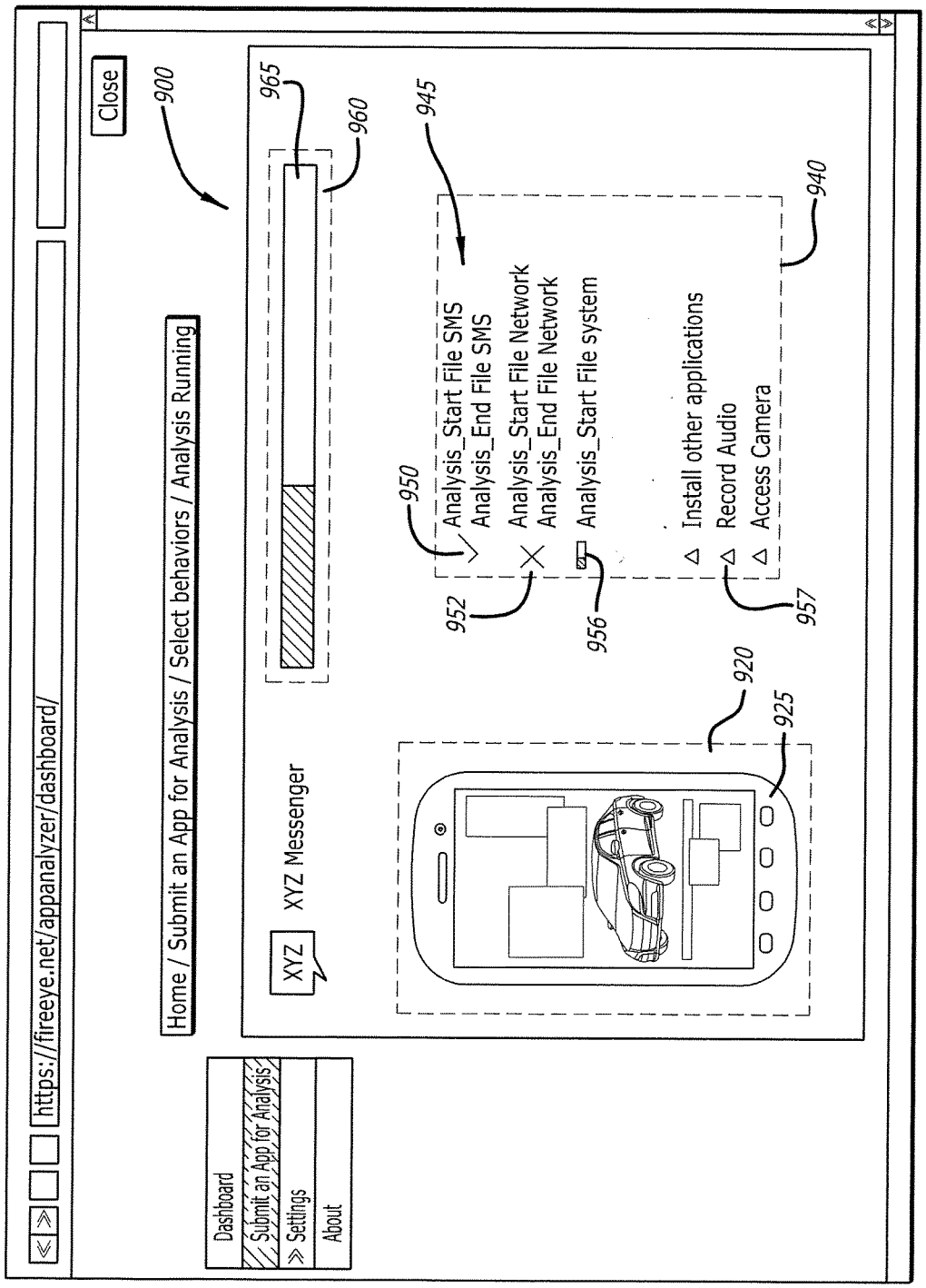
FIG. 9 is an exemplary embodiment of a user interface produced by the application analyzer of FIG. 3 that illustrates real-time activity during the anomalous behavior detection analysis.

Referring now to FIG. 9, an exemplary embodiment of fourth user interface display screen 900, which is produced by the application analyzer of FIG. 3 and illustrates real-time activity during the anomalous behavior detection analysis, is shown. As illustrated, fourth user interface display screen 900 is produced by user interaction, such as in response to selection of any "Start Analysis" objects 830, 890 and 895 of FIGS. 8A and 8B for example. Display screen 900 comprises a plurality of display areas that are dynamically updated during virtual processing of the test application. Such updates may be performed contemporaneous and in real-time (e.g. <1 sec. between successive updates), although other update mechanisms may be used in which updates are performed less often. These display areas include a video display area 920, a log display area 940 and a progress bar display area 960.

Video display area 920 is allocated to display video 925, which captures simulated operations of the test application (XYZ Messenger) during the anomalous behavior detection analysis in concert with analysis of the presence or absence of the selected events. During anomalous behavior analysis of the XYZ Messenger by one or more VMs in a run-time environment, as illustrated in FIGS. 2 and 3, the application analyzer uploads video 925 to the GUI logic, which renders, in real time, video 925 within video display area 920. The video 925 may illustrate static and/or dynamic testing of XYZ Messenger for anomalous behavior. The progress of the anomalous behavior detection analysis is represented by progress bar 965, where such progress is determined by the application analyzer.

Synchronous with playback of video 925, a textual log 945 is provided to identify the execution flow and which test behaviors have been completed, awaiting analysis or currently being analyzed. The display of interface display screen 900, especially the textual log 945, may be conducted in two different types of modes: Regular Display mode and Analyst Display mode. In Regular mode, the showing/listing of only detected anomalous behaviors, such as suspicious or important events/results for example, is conducted. In Analyst Display mode, the showing/listing of all events occurring in the application, including those related to only the execution of the application and those events that would have been forced by the mobile electronic device.

For completed test behaviors, during Analyst mode for example, a first image (check mark) 950 is rendered to identify whether the test behavior was not present, a second image ("X") 952 is rendered to identify that the test behavior was detected; a third image ("Δ") 954 is rendered where, at this point in the analysis, the test behavior has not been analyzed yet; and a fourth image (progress bar) 956 is rendered where the test behavior is currently being analyzed. The updating of entries within textual log 945 is synchronized with video 925 being displayed.

Figure 10:
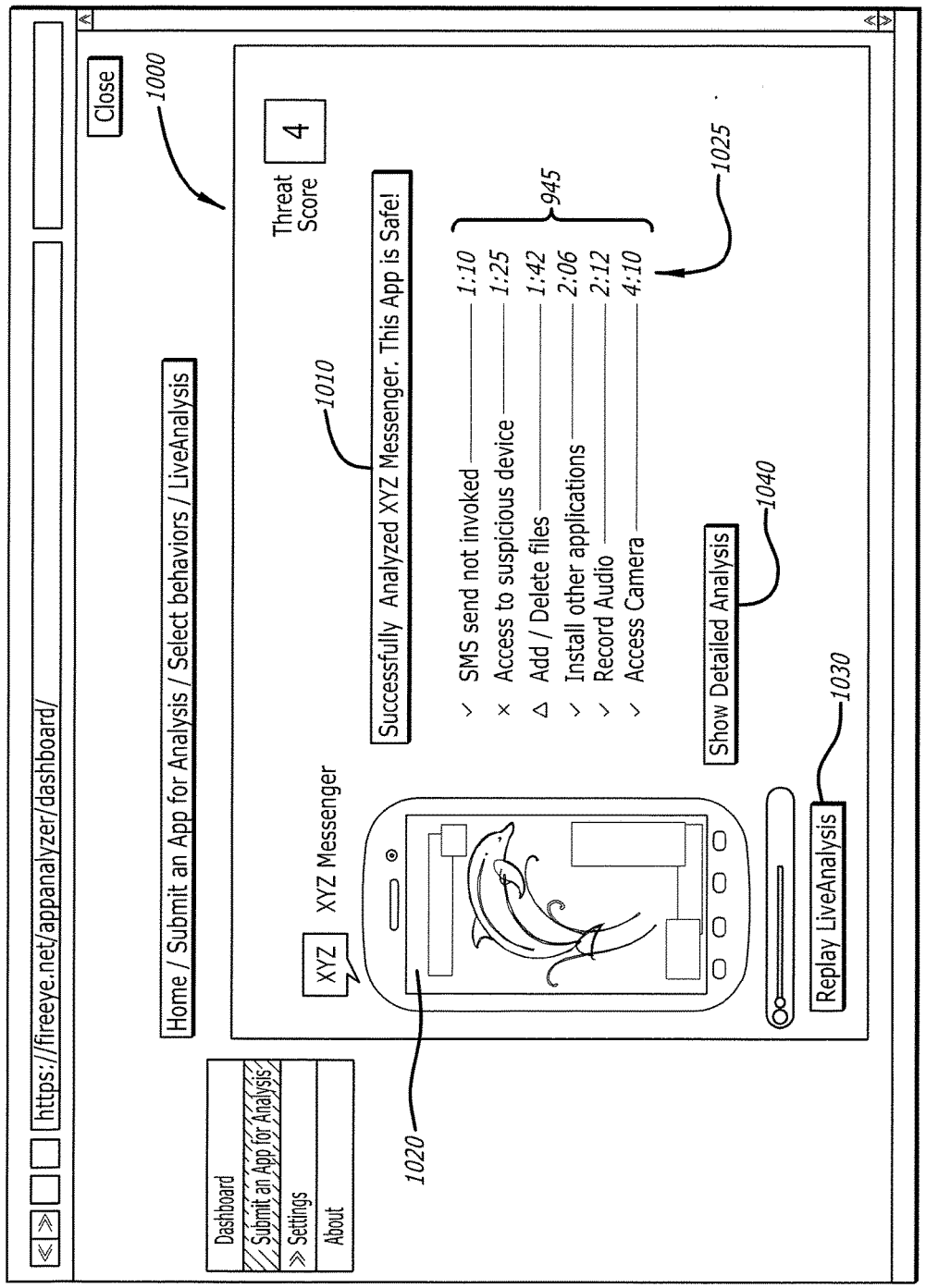
FIG. 10 is an exemplary embodiment of a user interface produced by the application analyzer of FIG. 3 that illustrates completion of the anomalous behavior detection analysis along with the final image or frame of the real-time analysis of the analyzed application and a dynamic textual log of the analyzed test behaviors.

Referring to FIG. 10, an exemplary embodiment of a user interface display screen 1000 produced by the application analyzer of FIG. 3 is shown. User interface display screen 1000 illustrates completion of the anomalous behavior analysis testing by display of a completion message 1010 and a final image or frame 1020 of video 925, with no progress bars being present in textual log 945. Herein, completion message 1010 is rendered that identifies (i) whether the test application has been successfully analyzed and (2) whether the test application is "safe" or "unsafe". The findings for each particular test behavior represented by indicia (e.g., symbols, color, etc.) along with elapsed time 1025 of that test behavior in the video are set forth in the completed textual log 945.

Figure 11:
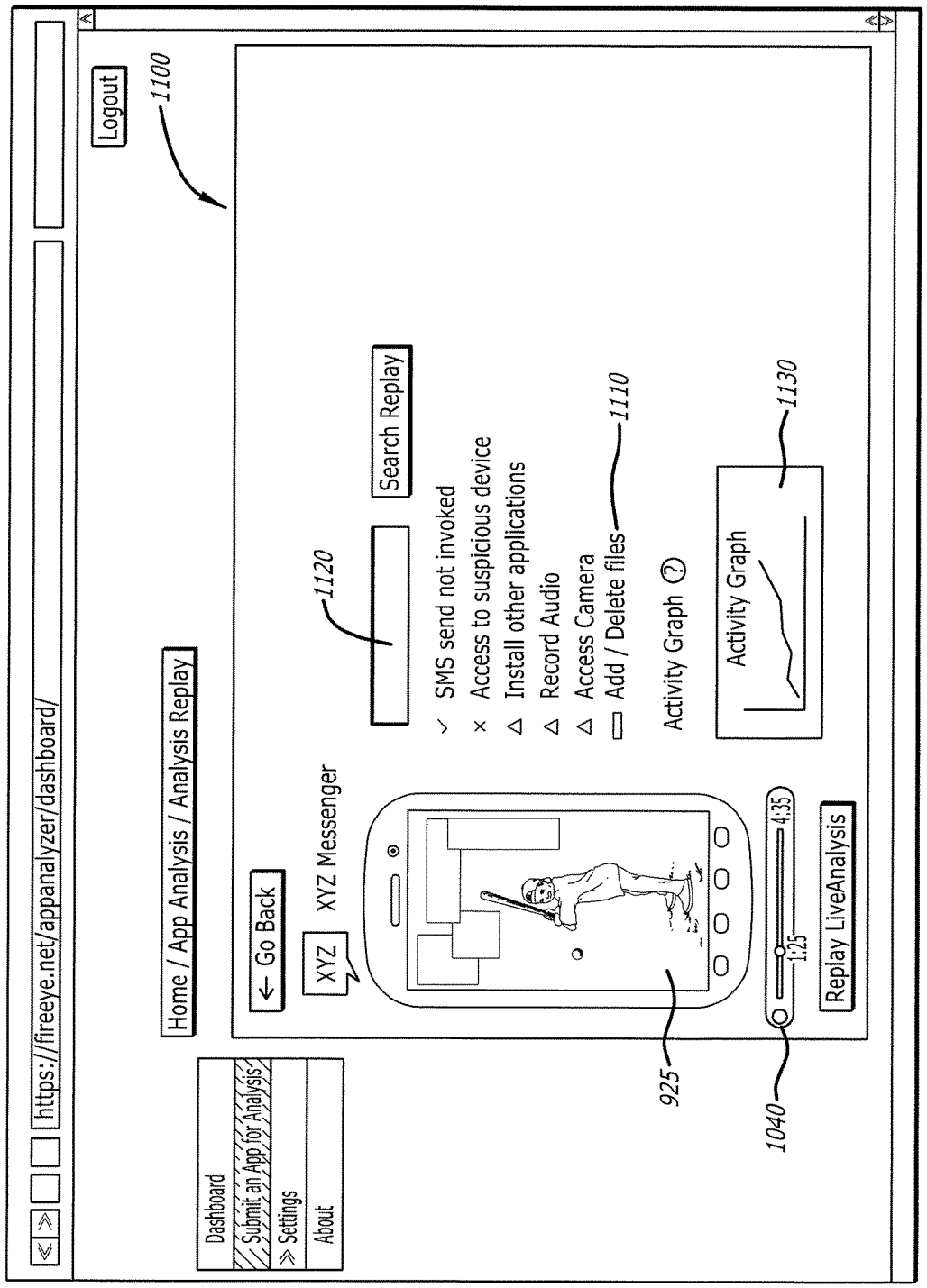
FIG. 11 is an exemplary embodiment of a user interface produced by the application analyzer of FIG. 3 that illustrates replay of video associated with the anomalous behavior detection analysis with event or behavioral searching and time-based indexing based on user interaction.

User interface display screen 1000 provides a first object (REPLAY) 1030 that, based upon user interaction, signals the GUI logic to replay video 925 as shown in FIG. 11. Based on user interaction with first object 1030, video 925 is replayed from the start, where a time bar 1040 positioned below video 925, may be used to replay certain segments of video 925 at selected times. Textual log 945 is synchronized with video 925 to illustrate status of different test behaviors in accordance with the default sequence or sequence selected by the user as illustrated in FIGS. 8A and 8B. The illustration of status may be through images, highlighting text description of the test behavior (e.g., bold, different colors, different font type, etc.).

In general terms, the video replay provides context for each event to explain away or confirm certain anomalous behaviors in light of what image displays (screenshots) may have been displayed or user interactions that have occurred. Some applications exhibit anomalies which may be viewed/verified as unwanted behaviors depending on when/where in the application the event occurred (e.g., audio recording started when expected or at unexpected time, or whether a permission is noted in a manifest). In order to provide such context, the displayed images of video 925 may capture the display output of the application software for at least a period of time (window) before and after an event included in the displayed textual log 945 has occurred.

Referring back FIG. 10, one or more displayed test behaviors in textual log 945 are user interactive. When selected by the user, the GUI logic replays video 925 starting at the time in the anomalous behavior analysis when monitoring of the selected test behavior commenced. This start time may be obtained by extracted a time stamp associated with the first captured image (or frame) of video 925 when the anomalous behavior analysis began to monitor for the selected test behavior. For example, upon user interaction with a third test behavior in the sequence (e.g. add/delete files on storage) as shown in FIG. 11, video data 925 commences with elapsed time of 1:25 minutes with this test behavior as represented by a blank progress bar 1110.

Additionally, display screen 1100 features a search field 1120 that enables the user to search for a particular event or test behavior at a particular point in the video replay. Also, an activity graph 1130 identifies the activities (e.g., number and frequency of API function calls, Java™ events, etc.) during the testing period for the anomalous behavior detection analysis. The particular activities may be obtained by selecting activity graph 1130 to denote a request for deeper analysis of the findings from the anomalous behavior detection analysis.

Figure 12:
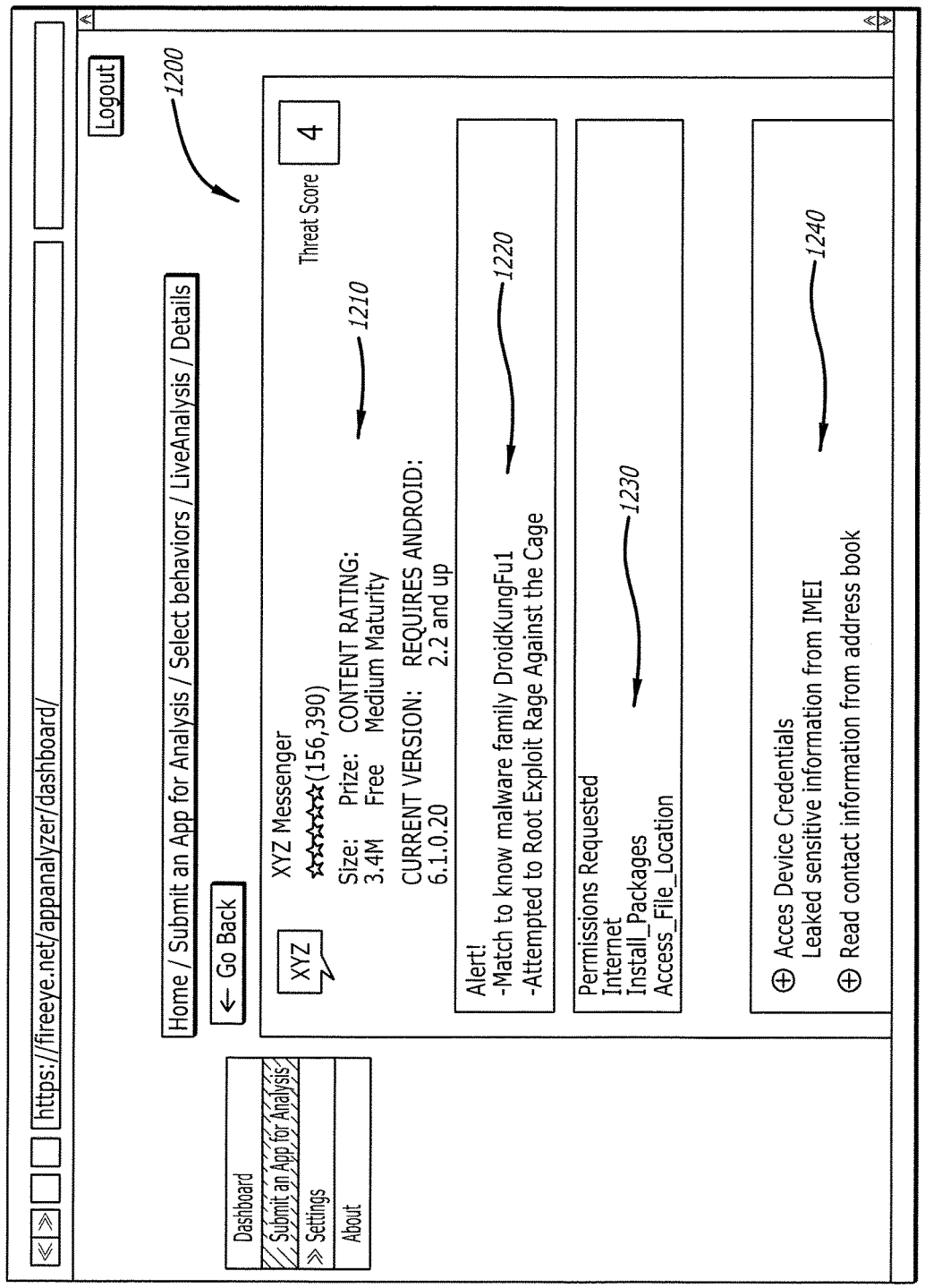
FIG. 12 is an exemplary embodiment of a user interface produced by the application analyzer of FIG. 3 that illustrates details of the results of the anomalous behavior detection analysis based on user interaction.

Referring back to FIG. 10, user interface display screen 1000 further signals the GUI logic, based on user interaction (e.g., selection of a second object (SHOW DETAILED ANALYSIS) 1040 by the user, to produce a screen display 1200 with a summary of test behavior failures as set forth in FIG. 12. Screen display 1200 comprises metadata 1210; alerts 1220 based on test behaviors where the security risk for the test behavior may vary for different customers; a listing of permissions 1230 requested during the anomalous behavior detection analysis; and a scrolling log 1240 outlining the success and failures of custom defined rules similar in form to textual log 945 for the test behaviors as shown in FIG. 10.

In the foregoing description, the invention is described with reference to specific exemplary embodiments thereof. It will, however, be evident that various modifications and changes may be made thereto without departing from the broader spirit and scope of the present invention as set forth in the appended claims. The specification and drawings are accordingly to be regarded in an illustrative rather than in a restrictive sense.

What is claimed is:

1. A method for detecting anomalous behavior by an application software under test that suggest a presence of malware, suspicious code or pernicious code, the method comprising:
    conducting an analysis of operations of the software executed by a virtual machine for (i) detecting an occurrence of one or more events, each of the one or more events being a monitored behavior of the software that occurs during execution by the virtual machine, and (ii) determining whether any behavior of one or more behaviors corresponding to the one or more events is an anomalous behavior indicating that the software includes malware, suspicious code or pernicious code;
    generating a plurality of display images based on the operations of the software; and
    generating, for display on the electronic device contemporaneously with the plurality of display images, a textual log including information associated with the one or more events and identifying if any of the one or more behaviors corresponds to the anomalous behavior,
    wherein display of the textual log is temporally coordinated with display of the plurality of display images to provide information associated with the one or more events during the analysis of the operations of the software along with display of one or more display images of the plurality of display images.

2. The method of claim 1, wherein the generating of the plurality of display images comprises capturing display output of the software during the operations.

3. The method of claim 2, wherein the plurality of display images comprise a sequence of display images corresponding to a displayed sequence of the one or more events detected by the analysis.

4. The method of claim 2, wherein the plurality of display images comprise a sequence of display images corresponding to an execution flow of the operations of the software.

5. The method of claim 1, wherein the plurality of display images correspond to images that would have been displayed if the software executed natively.

6. The method of claim 1, wherein the generating of the plurality of display images comprises indexing the plurality of display images by corresponding a display time for each display image of the plurality of display images with a behavior associated with an event of the one or more events being monitored during analysis of the software.

7. The method of claim 1, wherein the conducting of the analysis of operations of the software for detecting the occurrence of the one or more events comprises:
   generating a display screen for selecting and setting the one or more events corresponding to the one or more behaviors to be monitored;
   performing operations of the software within the virtual machine; and
   monitoring the one or more behaviors to determine whether at least one of the one or more behaviors corresponds to the anomalous behavior during analysis of the operations of the software performed within the virtual machine.

8. The method of claim 7, wherein the generating of the screen display comprises presenting a user interface to enable a user to customize a grouping or sequencing of behaviors of the one or more behaviors to be monitored.

9. The method of claim 1 being performed within the virtual machine running in a mobile electronic device and the software is designed for native execution on the mobile electronic device.

10. The method of claim 1, wherein the conducting of the analysis for the occurrence of the one or more events comprises monitoring for one or more anomalous behaviors including a malware-based behavior.

11. An apparatus for detecting anomalous behavior by software under test that suggests a presence of malware, suspicious code or pernicious code, the apparatus comprising:
   a hardware processor; and
   a storage device communicatively coupled to the hardware processor, the storage device comprises logic that, when executed by the hardware processor, (i) conducts an analysis of operations of the software for an occurrence of one or more events, (ii) generates a plurality of display images corresponding to a display output produced by the operations of the software, and (iii) generates and displays, contemporaneously and synchronized with the plurality of display images, a textual log that illustrates the one or more events being monitored during the analysis of the operations of the software and whether an event of the one or more events corresponds to an anomalous behavior indicating that the software includes malware, suspicious code or pernicious code.

12. The apparatus of claim 11, wherein the plurality of display images is a video.

13. The apparatus of claim 11, wherein the hardware processor executes the logic to conduct the analysis within one or more virtual machines.

14. The apparatus of claim 13, wherein the logic, when executed by the hardware processor, conducting the analysis by (a) responsive at least in part to user input, setting one or more behaviors to be monitored; (b) controlling the operations of the software conducted within one or more virtual machines; and (c) determining whether the one or more behaviors is detected during analysis of the operations of the software performed within the one or more virtual machines and corresponds to the one or more events.

15. The apparatus of claim 11, wherein the logic, when executed by the hardware processor, to conduct the analysis of operations of the software for the occurrence of the one or more events that comprise at least one anomalous behavior detected during the analysis of operations of the software within one or more virtual machines.

16. An apparatus for detecting anomalous behavior by an application software under test that suggests a presence of malware, suspicious code or pernicious code, the apparatus comprising:
   a hardware processor; and
   a storage device communicatively coupled to the hardware processor, the storage device to store logic that, when executed by the hardware processor, to (i) conduct an analysis of operations of the software for an occurrence of one or more events, (ii) generate a video of a display output produced by the operations of the software, (iii) generate and display, contemporaneously and synchronized with the video, a textual log including information associated with the one or more events, the textual log provides information as to (i) when each event of the one or more events occurs within an execution flow of the operations of the software and (ii) when each event corresponds to an anomalous behavior indicating that the software includes malware, suspicious code or pernicious code.

17. The apparatus of claim 16, wherein the logic, when executed by the hardware processor, to further provide, during playback of the video, reciprocal graphic interaction between the displayed video and the displayed textual log responsive to user input.

18. The apparatus of claim 16, wherein the logic, executed by the hardware processor, to index the video so as to permit access to a desired segment of the video in accordance with at least one of a particular playback time in the video and a particular analyzed event of the one or more events.

19. The apparatus of claim 18, wherein the logic, when executed by the hardware processor, to conduct the analysis of operations of the software for the occurrence of the one or more events that comprise at least one anomalous behavior detected during the analysis of operations of the software within one or more virtual machines.

20. The method of claim 1, wherein the plurality of display images comprises a video.

21. The method of claim 20 further comprising indexing the video so as to permit access to a desired segment of the video in accordance with at least one of a particular playback time in the video and a particular analyzed event of the one or more events.

22. The method of claim 20 further comprising indexing of the video so as to permit a user, by user interaction, to access a desired display image of the video in accordance with at least one of (i) a playback time and (ii) an analyzed event of the one or more events.

23. The method of claim 20, wherein the analysis of the operations of the software for the occurrence of the one or more events comprises detecting at least one anomalous behavior during the analysis of the operations of the software within one or more virtual machines.

24. The method of claim 8, wherein the generating of the screen display further comprises customizing as to when the behaviors are to be monitored.

25. The apparatus of claim 11, wherein the plurality of display images comprises a video.

* * * * *